US012680838B2

(12) United States Patent
Jansson

(10) Patent No.: US 12,680,838 B2
(45) Date of Patent: Jul. 14, 2026

(54) INDUCTIVE POSITION TRANSDUCER SYSTEM WITH IMPEDANCE CIRCUIT PORTION

(71) Applicant: Mitutoyo Corporation, Kanagawa-ken (JP)

(72) Inventor: Bjorn Erik Bertil Jansson, Snohomish, WA (US)

(73) Assignee: Mitutoyo Corporation, Kanagawa-Ken (JP)

( * ) Notice: Subject to any disclaimer, the term of this patent is extended or adjusted under 35 U.S.C. 154(b) by 313 days.

(21) Appl. No.: 18/457,181

(22) Filed: Aug. 28, 2023

(65) Prior Publication Data

US 2025/0076086 A1      Mar. 6, 2025

(51) Int. Cl.
*G01D 5/22* (2006.01)
*G01B 7/00* (2006.01)

(52) U.S. Cl.
CPC ........... *G01D 5/2208* (2013.01); *G01B 7/003* (2013.01)

(58) Field of Classification Search
CPC .......... G01D 5/14; G01D 5/20; G01D 5/2006; G01D 5/2013; G01D 5/202; G01D 5/204; G01D 5/2046; G01D 5/2053; G01D 5/2066; G01D 5/2073; G01D 5/2086; G01D 5/22; G01D 5/2208; G01D 5/225; G01D 5/2258; G01D 5/2266; G01D 5/2275; G01D 5/2291; G01D 5/24404; G01D 5/2451; G01D 5/2452; G01D 5/2455; G01D 5/34776; G01D 18/00;

G01D 3/028; G01D 2205/14; G01D 2205/73; G01P 3/487; G01P 3/488; G01P 3/489; G01R 15/181; G01R 19/2509; G01R 27/02; G01R 33/02
See application file for complete search history.

(56) References Cited

U.S. PATENT DOCUMENTS

| | | | | |
|---|---|---|---|---|
| 4,071,819 A | * | 1/1978 | De Santis | G01R 27/02 |
| | | | | 324/123 R |
| 4,651,405 A | | 3/1987 | McMurtry | |
| 4,810,966 A | | 3/1989 | Schmall | |
| 5,083,084 A | * | 1/1992 | Bauer | G01P 3/49 |
| | | | | 324/207.25 |
| 5,386,194 A | * | 1/1995 | Moehlmann | G01R 27/02 |
| | | | | 324/650 |

(Continued)

*Primary Examiner* — Steven L Yeninas
(74) *Attorney, Agent, or Firm* — Seed Intellectual Property Law Group LLP

(57) ABSTRACT

An inductive position transducer system is provided, including an inductive position transducer and one or more sensing circuit portions. Each sensing circuit portion is connected to first and second sensing coil terminals and is configured to receive a signal from a respective sensing coil and comprises an impedance circuit portion and an input circuit portion (e.g., of an ASIC). The impedance circuit portion comprises at least first and second impedance circuit portion components. The first impedance circuit portion component is coupled between first and second impedance circuit portion nodes. The second impedance circuit portion component is at least one of: coupled between the first coil terminal and the first impedance circuit portion node; or coupled between the first impedance circuit portion node and the second impedance circuit portion node (for which a third impedance circuit portion component may also be provided in some implementations).

20 Claims, 9 Drawing Sheets

(56)                    References Cited

U.S. PATENT DOCUMENTS

| | | | |
|---|---|---|---|
| 5,841,274 A | 11/1998 | Masreliez et al. | |
| 5,886,519 A | 3/1999 | Masreliez et al. | |
| 5,901,458 A | 5/1999 | Andermo et al. | |
| 5,973,494 A | 10/1999 | Masreliez et al. | |
| 6,005,387 A | 12/1999 | Andermo et al. | |
| 6,011,389 A | 1/2000 | Masreliez et al. | |
| 6,043,644 A | 3/2000 | de Coulon et al. | |
| 6,304,832 B1 | 10/2001 | Andermo et al. | |
| 6,331,759 B1 * | 12/2001 | Atmur | G01D 5/2073 |
| | | | 318/605 |
| 6,525,530 B1 | 2/2003 | Jansson et al. | |
| 6,859,762 B2 | 2/2005 | Mawet | |
| 6,971,183 B2 | 12/2005 | Brenner et al. | |
| 7,307,392 B2 | 12/2007 | Kang et al. | |
| 7,323,863 B2 | 1/2008 | Mawet | |
| 7,652,275 B2 | 1/2010 | Gladnick | |
| 8,438,746 B2 | 5/2013 | Usui | |
| 9,435,663 B2 | 9/2016 | Cook | |
| 9,614,524 B1 * | 4/2017 | Kawasaki | H01J 37/32165 |
| 9,772,202 B1 | 9/2017 | Cook | |
| 9,877,042 B1 | 1/2018 | Jansson et al. | |
| 10,145,666 B2 | 12/2018 | Jansson | |
| 10,184,773 B2 | 1/2019 | Jansson | |
| 10,775,199 B2 | 9/2020 | Cook | |
| 10,866,080 B2 | 12/2020 | Cook et al. | |
| 10,914,570 B2 | 2/2021 | Hamner et al. | |
| 2003/0210035 A1 * | 11/2003 | Manlove | G01D 3/02 |
| | | | 324/166 |
| 2011/0109303 A1 * | 5/2011 | Zhitomirsky | G01D 5/204 |
| | | | 324/683 |
| 2012/0293166 A1 * | 11/2012 | Lee | G01D 5/2046 |
| | | | 324/207.17 |
| 2012/0293187 A1 * | 11/2012 | Morris, III | H03H 7/40 |
| | | | 324/649 |
| 2017/0176171 A1 | 6/2017 | Harsila et al. | |
| 2017/0222738 A1 * | 8/2017 | Hammerschmidt | G01P 3/44 |
| 2017/0363673 A1 * | 12/2017 | Mukherjee | G01R 31/50 |
| 2018/0156594 A1 | 6/2018 | Jansson | |
| 2019/0277803 A1 * | 9/2019 | Ives | G01D 5/243 |
| 2020/0141714 A1 | 5/2020 | Cook et al. | |
| 2020/0141717 A1 | 5/2020 | Hamner et al. | |
| 2021/0116228 A1 | 4/2021 | Hamner | |
| 2021/0117020 A1 | 4/2021 | Hamner | |
| 2022/0205773 A1 | 6/2022 | Hamner et al. | |
| 2022/0205814 A1 | 6/2022 | Cook | |
| 2022/0357365 A1 * | 11/2022 | Jurisch | G01R 19/2509 |
| 2023/0104078 A1 * | 4/2023 | Choi | G01D 5/2216 |
| | | | 324/207.15 |
| 2023/0150571 A1 * | 5/2023 | Shirakawa | G01D 5/202 |
| | | | 180/443 |

* cited by examiner

Start

*800*

Provide a drive signal at an operating frequency to a first field generating coil portion for generating a changing magnetic flux that encompasses at least part of a first sensing coil portion, the first sensing coil portion having a first coil terminal, a second coil terminal and a coil impedance

*810*

Receive at a sensing circuit portion a first sensing coil signal from the first sensing coil portion that indicates a relative position between the first sensing coil portion and a scale member, the sensing circuit portion comprising an impedance circuit portion connected to the first and second coil terminals, and an input circuit portion, wherein the impedance circuit portion comprises a first impedance circuit portion component and a second impedance circuit portion component, wherein the first impedance circuit portion component is coupled between a first impedance circuit portion node and a second impedance circuit portion node; and the second impedance circuit portion is at least one of: coupled between the first impedance circuit portion node and the second impedance circuit portion node; or coupled between the first coil terminal and the first impedance circuit portion node; and the input circuit portion is connected to the first and second impedance circuit portion nodes, the input circuit portion having an input impedance during operation, wherein the input circuit portion is configured to receive an oscillating sensing signal at the first and second impedance circuit portion nodes, wherein a combined impedance portion comprising at least the impedance circuit portion and the first sensing coil portion has a combined impedance presented to the input circuit portion during operation

*820*

End

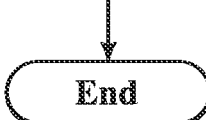

*FIG.8*

INDUCTIVE POSITION TRANSDUCER SYSTEM WITH IMPEDANCE CIRCUIT PORTION

BACKGROUND

Technical Field

This disclosure relates to metrology and, more particularly, to inductive position transducer systems.

Description of the Related Art

Inductive position transducer systems may be utilized to measure relative displacements between one or more sensing coils (e.g., which may alternatively be referred to as receiver coils or receiver windings) and one or more signal modulating elements (e.g., scale elements) that modulate the inductive coupling between the sensing coils and a field generating coil (e.g., which may alternatively be referred to as a transmitter coil). In various conventional inductive position transducer systems (e.g., such as those disclosed in U.S. Pat. Nos. 6,005,387 and 6,011,389, each of which is hereby incorporated herein by reference in its entirety), a relatively low power intermittent drive circuit is used to supply a time-varying drive signal at an operating frequency to the field generating coils.

An example of an inductive position transducer system using highly accurate measuring techniques is shown in U.S. Pat. No. 5,901,458, which is hereby incorporated herein by reference in its entirety. As described in the '458 patent, the inductive position transducer system has a reduced offset position transducer that uses a read head that is movable along a scale. The electronics provide a precise measurement of the read head's position on the scale. Another example is shown in U.S. Pat. No. 5,886,519, which is hereby incorporated herein by reference in its entirety. The '519 patent discloses an absolute inductive position transducer system for high accuracy applications, such as linear or rotary encoders, electronic calipers and the like. The inductive position transducer system uses two members movable relative to each other. The first member contains at least one active field generating coil (e.g., a transmitter coil) for generating a magnetic field and at least one sensing coil (e.g., a receiver coil) for receiving the generated magnetic field. The passive second member (e.g., a scale member) includes passive signal modulating elements that modulate the received field depending on their position relative to the at least one sensing coil. An electronic circuit coupled to the at least one field generating coil and the at least one sensing coil compares the outputs of the at least one sensing coil, evaluates the absolute position between the two members, and provides the determined absolute position on a display.

While such inductive position transducer systems can be utilized for determining a position between two members, in some applications it may be desirable to improve the levels and/or processing of the signals from the sensing coils. An inductive position transducer system with improved characteristics would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An inductive position transducer system is provided, including an inductive position transducer and a sensing circuit portion. The inductive position transducer comprises a first sensing coil portion (e.g., with a first sensing coil) having a first coil terminal, a second coil terminal and a coil impedance. The sensing circuit portion is configured to receive a first sensing coil signal from the first sensing coil portion. The sensing circuit portion comprises an impedance circuit portion and an input circuit portion (e.g., of an application-specific integrated circuit (ASIC)).

The impedance circuit portion is connected to the first and second coil terminals. The impedance circuit portion comprises a first impedance circuit portion component and a second impedance circuit portion component. The first impedance circuit portion component is coupled between a first impedance circuit portion node and a second impedance circuit portion node. The second impedance circuit portion component is at least one of: coupled between the first impedance circuit portion node and the second impedance circuit portion node; or coupled between the first coil terminal and the first impedance circuit portion node.

The input circuit portion (e.g., of the ASIC) is connected to the first and second impedance circuit portion nodes. The input circuit portion has an input impedance during operation (e.g., during which an operating frequency is utilized), wherein the input circuit portion is configured to receive an oscillating sensing signal at the first and second impedance circuit portion nodes. A combined impedance portion comprising at least the impedance circuit portion and the first sensing coil portion has a combined impedance presented to the input circuit portion (e.g., of the ASIC) during operation. In various implementations, the components of the impedance circuit portion may be selected/configured so that the combined impedance is approximately matched, or at least closer to being matched, to the input impedance of the input circuit portion (e.g., as compared to the impedance of the sensing coil portion by itself which is otherwise typically not well matched to the input impedance of the input circuit portion).

In accordance with another aspect, a method is provided of operating an inductive position transducer system comprising at least a scale member, a first field generating coil portion, and at least a first sensing coil portion (e.g., with a first sensing coil) having a first coil terminal, a second coil terminal and a coil impedance. The method includes: providing a drive signal at an operating frequency to the first field generating coil portion for generating a changing magnetic flux that encompasses at least part of the first sensing coil portion; and receiving at the sensing circuit portion a first sensing coil signal from the first sensing coil portion that indicates a relative position between the first sensing coil portion and the scale member. The sensing circuit portion comprises the impedance circuit portion and the input circuit portion. In various implementations, the method may further include determining a relative position between the first sensing coil portion and the scale member (e.g., as corresponding to a relative position between a read head and the scale member), based at least in part on the received oscillating sensing signal at the first and second impedance circuit portion nodes.

In accordance with another aspect, the sensing circuit portion is provided for inclusion in an inductive position transducer system. The sensing circuit portion comprises the impedance circuit portion and the input circuit portion.

BRIEF DESCRIPTION OF THE DRAWINGS

FIG. 8 is a flow diagram illustrating an exemplary routine for operating an inductive position transducer system.

DETAILED DESCRIPTION

Figure 1:
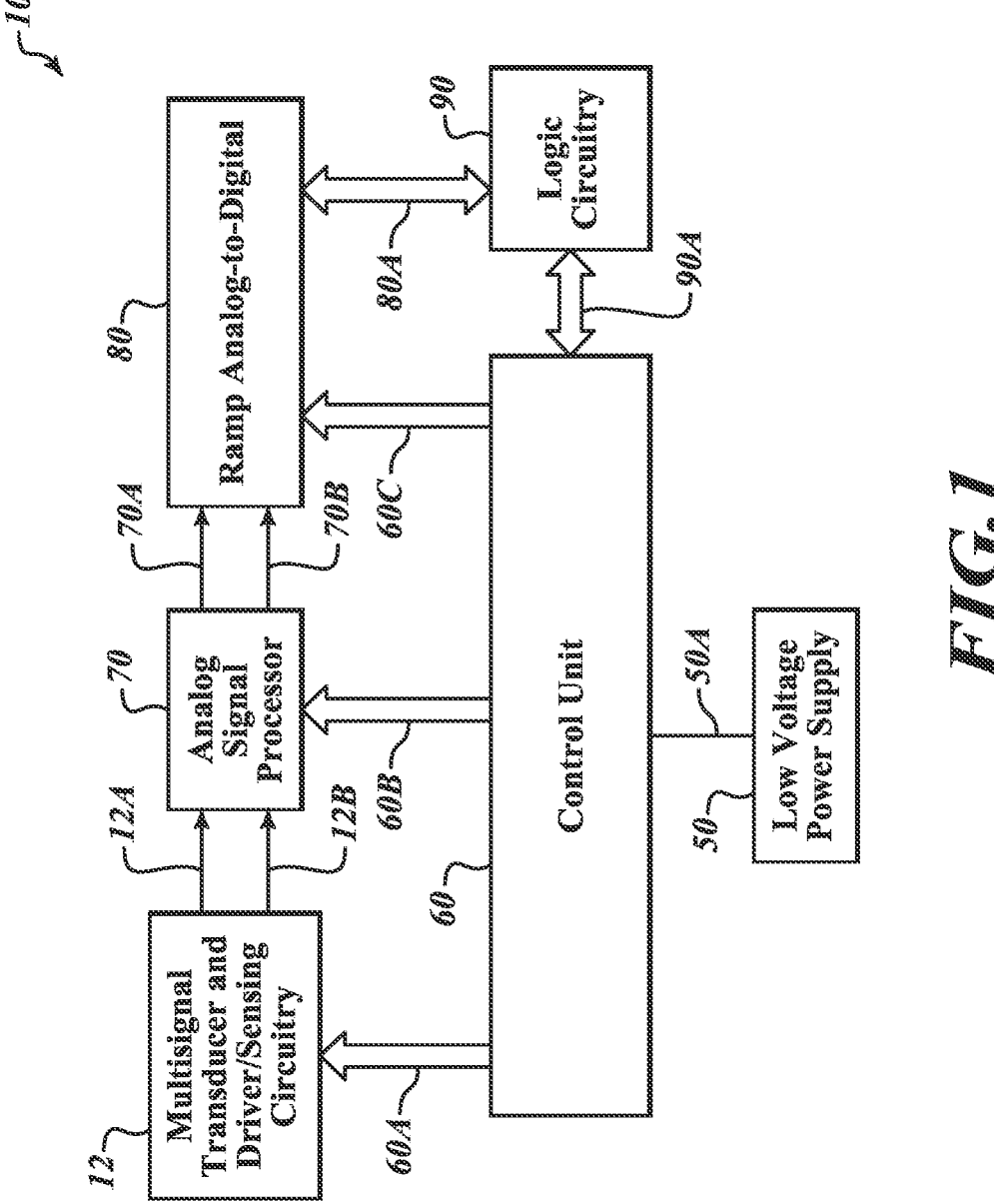
FIG. 1 is a block diagram of an inductive position transducer system.

FIG. 1 is a block diagram of an inductive position transducer system 10. As shown in FIG. 1, the inductive position transducer system 10 includes a multi-signal transducer and driver/sensing circuitry 12, which outputs analog differential signals on signal lines 12A and 12B to an analog signal processor 70. The analog signal processor 70 outputs differential signals on signal lines 70A and 70B to a ramp analog-to-digital converter 80. The ramp analog-to-digital converter 80 outputs digital values over a data line 80A to a logic circuitry 90. Logic circuitry 90 provides and receives signals from a control unit 60 over a data and power bus 90A.

The control unit 60 also provides control signals over a data and power bus 60A to the multi-signal transducer and driver/sensing circuitry 12, control signals over a data and power bus 60B to the analog signal processor 70, and control signals over a data and power bus 60C to the ramp analog-to-digital converter 80. A low voltage power supply 50, may supply power to the entire inductive position transducer subsystem 10 through one or more power lines 50A, the power further distributed through the various data and power buses of the system, and subject to the control of the digital control unit 60. Additional details regarding the operations and processing of an inductive position transducer system similar to that of FIG. 1 are described in U.S. Pat. No. 6,859,762, which is hereby incorporated herein by reference in its entirety.

While FIG. 1 shows a functional block diagram for the inductive position transducer system 10, it will be appreciated that the inductive position transducer system 10 is presented as an exemplary embodiment. It will be appreciated that the transducer in circuitry 12 may be implemented using any appropriate known or later developed multi-signal transducer, including, for example, the transducers disclosed in the incorporated '458 and '519 patents.

Figure 2:
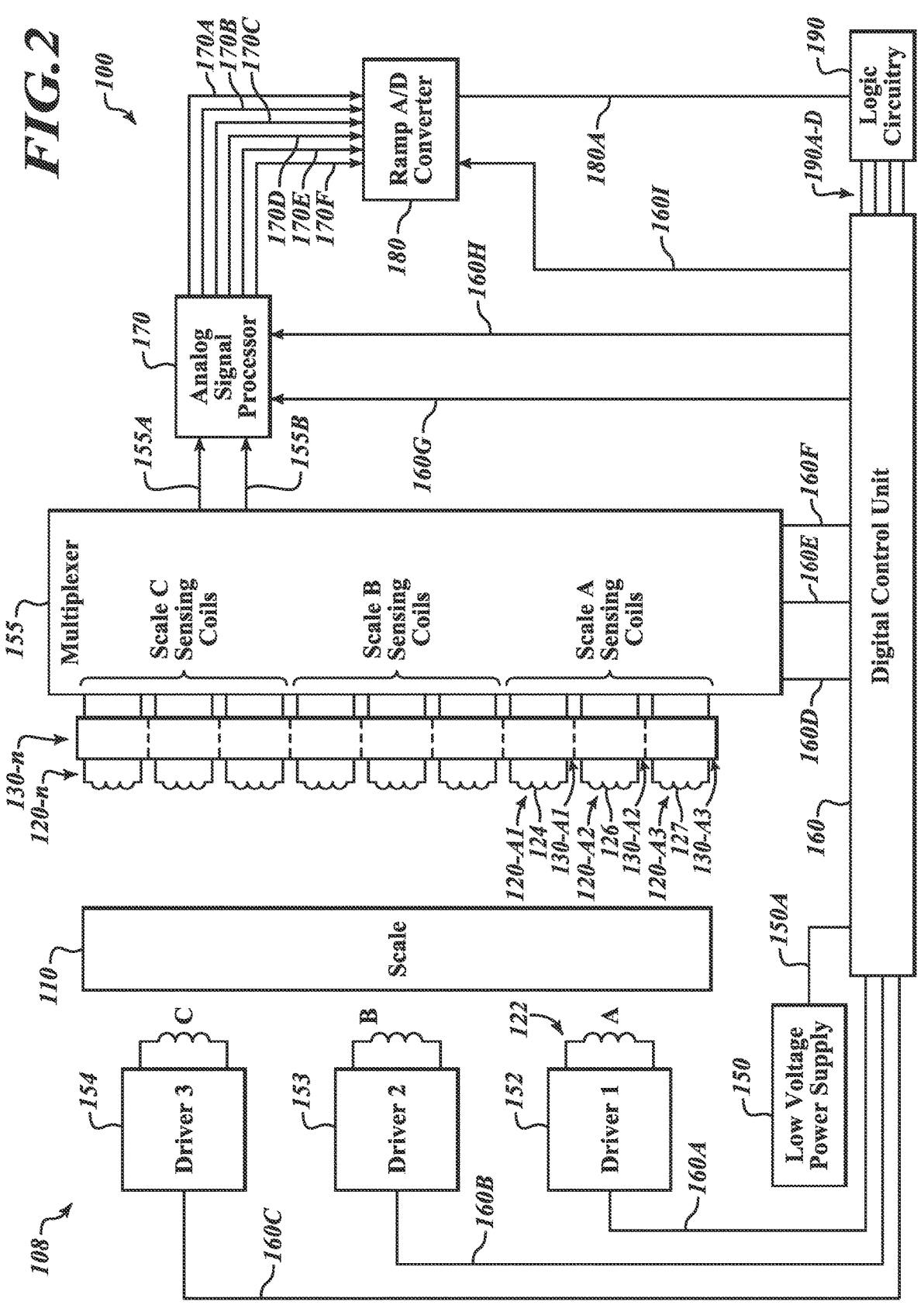
FIG. 2 is a block diagram of a more specific implementation of an inductive position transducer system such as that of FIG. 1.

FIG. 2 is a block diagram of a more specific implementation of an inductive position transducer system 100, which may be one implementation of the system of FIG. 1. The inductive position transducer system 100 includes an inductive position transducer 108, which comprises field generating coil portions including field generating coils A-C, a scale member 110, and sensing coil portions 120-n including sensing coils, as will be described in more detail below. In one implementation, multiple three-phase transducer coils are used. FIG. 2 shows an example of a three-scale track design, where there are three sets of three-phase sensing coils. An example of a three-scale track design is further described in more detail in U.S. Pat. No. 6,304,832, which is hereby incorporated herein by reference in its entirety.

As shown in FIG. 2, the inductive position transducer system 100 includes a field generating coil portion 122 (e.g., comprising a field generating coil A) that is connected to a driver circuit 152. First, second and third sensing coil portions 120-A1, 120-A2 and 120-A3 comprise first, second, and third sensing coils 124, 126 and 127, respectively. The field generating coil A of the field generating coil portion 122 is indirectly inductively coupled via signal modulating elements (e.g., comprising conductive plates, or coupling loops, etc.) formed on the scale member 110 of the inductive position transducer 108 to the first, second, and third sensing coils 124, 126 and 127 of the first, second and third sensing coil portions 120-A1, 120-A2 and 120-A3.

In accordance with principles as disclosed herein, each of the first, second and third sensing coil portions 120-A1, 120-A2 and 120-A3 is coupled to a first, second and third impedance circuit portion 130-A1, 130-A2 and 130-A3, respectively. More generally, each of the sensing coil portions 120-n of the inductive position transducer 108 are coupled to a respective impedance circuit portion 130-n. As will be described in more detail below (e.g., with respect to FIGS. 3-8), the inclusion of the impedance circuit portions may result in certain desirable features (e.g., such as an increase in the signal available to input circuit portions, etc.) In various implementations, input circuit portions (e.g., as will be described in more detail below with respect to FIG. 3, etc.) that are coupled to the impedance circuit portions 130-n may be included in a portion of the circuitry that follows the impedance circuit portions (e.g., such as in one of the circuit portions 155, 170, etc. that are described in more detail below).

As illustrated in FIG. 2, the first, second and third impedance circuit portions 130-A1, 130-A2 and 130-A3 are coupled to a multiplexer 155 (e.g., which as noted above in certain implementations may include one or more respective input circuit portions, or for which one or more respective input circuit portions may alternatively be included in subsequent circuitry). A differential output of the multiplexer 155 is connected through lines 155A and 155B to an analog signal processor 170. The differential output of the analog signal processor 170 is provided on six output lines 170A to 170F to the input of an analog-to-digital converter 180. The analog-to-digital converter 180 converts the differential output of the analog signal processor 170 from an analog signal to a digital signal. The digital signal from the analog-to-digital converter 180 is output on a line 180A to logic circuitry 190, which processes the digital signal from the analog-to-digital converter 180 to determine the relative position between the read head (e.g., which comprises the field generating coil portions and the sensing coil portions) and the scale member 110.

Positions within a wavelength can be uniquely identified by the logic circuitry 190 according to known techniques and equations (e.g., such as disclosed in the incorporated '458 and '519 patents). The logic circuitry 190 also controls the sequence of signal sampling by outputting a control signal over signal lines 190A-190D to a digital control unit 160. The digital control unit 160 controls the sequence of transmission, signal sampling and analog-to-digital conversion by outputting control signals on the power and signal bus lines 160A-1601 to the drivers 152-154, multiplexer 155, the analog signal processor 170 and the ramp analog-to-digital converter 180.

In particular, as shown in FIG. 2, the digital control unit 160 outputs control signals over the power and signal bus lines 160A-160C to the drivers 152-154, respectively, to controllably excite the field generating coils A-C (i.e., wherein the field generating coil portion 122 comprises the field generating coil A). The digital control unit 160 also outputs switch and control signals on the power and signal bus lines 160D-160F to the multiplexer 155. In various implementations, the control signals on lines 160D-160F determine which of the possible phases of the multi-scale-track, multi-phase sensing coils 124, 126 and 127 is input to the analog signal processing circuits 170 that follow the multiplexer 155. A low voltage power supply 150 may supply power to the entire inductive position transducer system 100 through one or more power lines 150A, with the power further distributed through the various data and power buses of the system, and subject to the control of the digital control unit 160.

As noted above, FIG. 2 shows an example of a three-scale track design, where there are three sets of three-phase sensing coils. In various implementations, the multiplexer 155 may choose one signal, or in the case of differential measurements, one signal pair, to be output to the analog signal processor 170. The chosen signal, or signal pair, is then processed by the analog signal processor 170. The analog signal processor 170 is controlled by the control signals on lines 160G and 160H. The output of the analog signal processor 170 is provided on signal lines 170A-170F, which are input to analog-to-digital converter 180. The analog-to-digital converter 180 is controlled by the control signals on line 1601. The logic circuitry 190 can access the output of the analog-to-digital converter 180. Furthermore, because the logic circuitry 190 controls the operation of the digital control unit 160, the logic circuitry 190 can choose to select the scale tracks or phases in any sequential order.

As described in more detail in U.S. Pat. No. 6,304,832, which is hereby incorporated herein by reference in its entirety, an embodiment similar to that above that describes signal multiplexing between the multiple phases of a single set of sensing coils will also apply equally well to the multiplexing between the multiple phases of two or more sets of multi-phase sensing coils. For example, in a three-scale track system as shown in FIG. 2, the input multiplexer 155 can choose between 9 possible phase pairs to process. To cancel certain circuit errors, it can also choose these phase pairs in a reverse polarity mode that effectively inverts the signal. Thus, in various implementations there may be in total 18 possible ways to process the 9 phase pairs of a three-scale-track, three-phase system.

Figure 3:
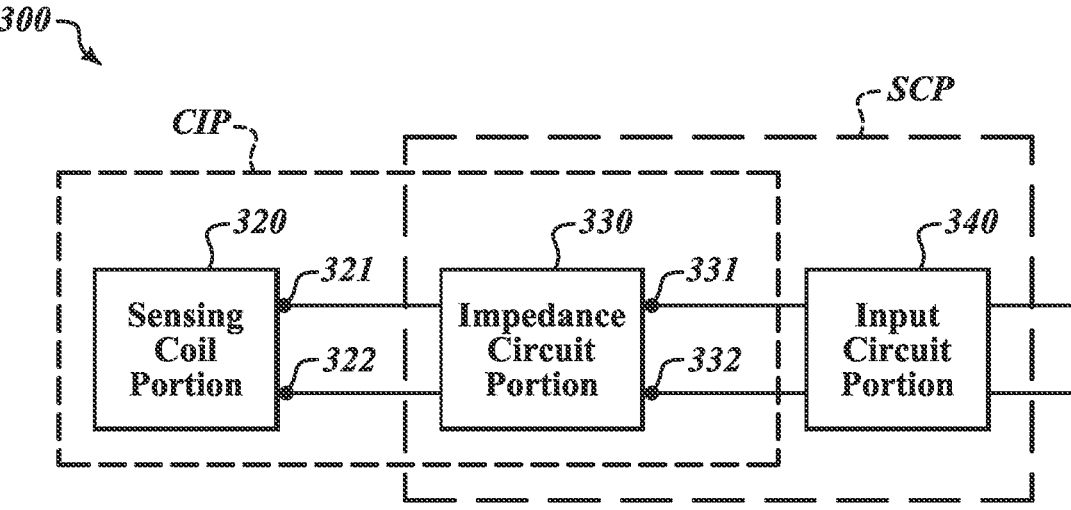
FIG. 3 is a diagram of a sensing coil circuitry portion of an inductive position transducer system such as that of FIGS. 1 and 2.

FIG. 3 is a diagram of a sensing coil circuitry portion 300 of an inductive position transducer system such as that of FIGS. 1 and 2. As illustrated in FIG. 3, the sensing coil circuitry portion 300 includes a sensing coil portion 320, an impedance circuit portion 330, and an input circuit portion 340 (e.g., which may each be an implementation of a sensing coil portion 120-n, an impedance circuit portion 130-n, and an input circuit portion, respectively, as described above with respect to FIG. 2). The sensing coil portion 320 (e.g., including a sensing coil) has a first coil terminal 321 and a second coil terminal 322. The sensing coil portion 320 also has a coil impedance (e.g., a coil impedance $Z_{Rx}$ as will be described in more detail below).

A sensing circuit portion SCP includes the impedance circuit portion 330 and the input circuit portion 340. The sensing circuit portion SCP is coupled to the sensing coil portion 320 and is configured to receive a sensing coil signal from the sensing coil portion 320 (e.g., in the implementation of FIG. 2, each sensing coil portion 120-n may be coupled to a respective sensing circuit portion). The impedance circuit portion 330 is connected to the first and second coil terminals 321 and 322, and has first and second impedance circuit portion nodes 331 and 332. The input circuit portion 340 is connected to the first and second impedance circuit portion nodes 331 and 332, and has an input impedance during operation (e.g., for which the input impedance may correspond to an impedance of a termination resistor RT of the input circuit portion 340, as will be described in more detail below).

The input circuit portion 340 is configured to receive an oscillating sensing signal at the first and second impedance circuit portion nodes 331 and 332 (e.g., as resulting from the first sensing coil signal from the first sensing coil portion 320 as passing through the impedance circuit portion 330). In various implementations, the input circuit portion 340 may represent an input portion of additional circuitry of the inductive position transducer system (e.g., such as described above with respect to FIG. 2, and for which in certain implementations the additional circuitry may be included on an application-specific integrated circuit (ASIC), for which the input circuit portion 340 may represent an input portion of the ASIC).

As further illustrated in FIG. 3, a combined impedance portion CIP includes at least the first sensing coil portion 320 and the impedance circuit portion 330, and has a combined impedance presented to the input circuit portion 340 during operation. In various implementations, the components of the impedance circuit portion 330 may be selected so that the combined impedance is approximately matched, or at least closer to being matched, to the input impedance of the input circuit portion 340 (e.g., as compared to the impedance of the sensing coil portion 320 by itself which is typically not well matched to the input impedance of the input circuit portion 340). As will be described in more detail below, FIGS. 4A-4C, 5A-5B and 6A-6B illustrate various examples of components that may be included in the impedance circuit portion 330. In addition, certain example techniques for determining/selecting the corresponding components will be described in more detail below with respect to FIGS. 7A-7D.

Figure 4A:
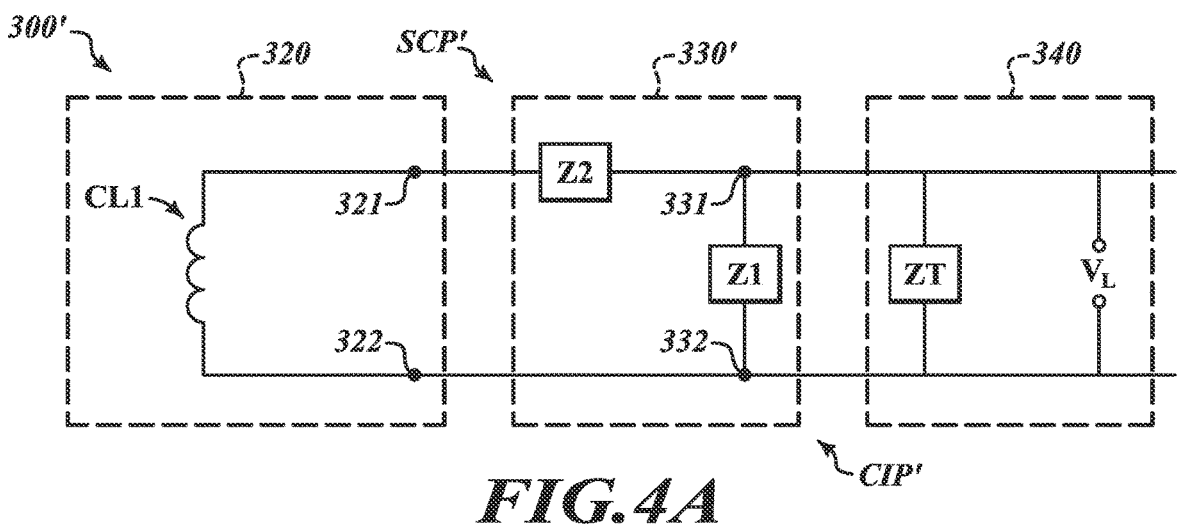
FIGS. 4A-4C are diagrams of implementations of the sensing coil circuitry portion of FIG. 3 as including a first impedance circuit portion component as coupled between a first impedance circuit portion node and a second impedance circuit portion node and including a second impedance circuit portion component as coupled between a first coil terminal and the first impedance circuit portion node.
Figure 4B:
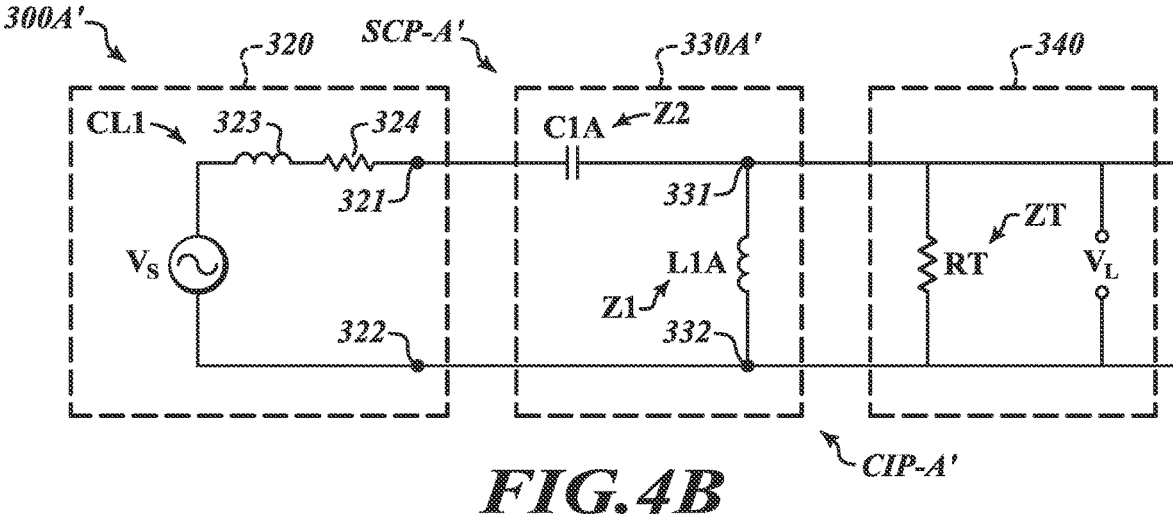
Figure 4C:
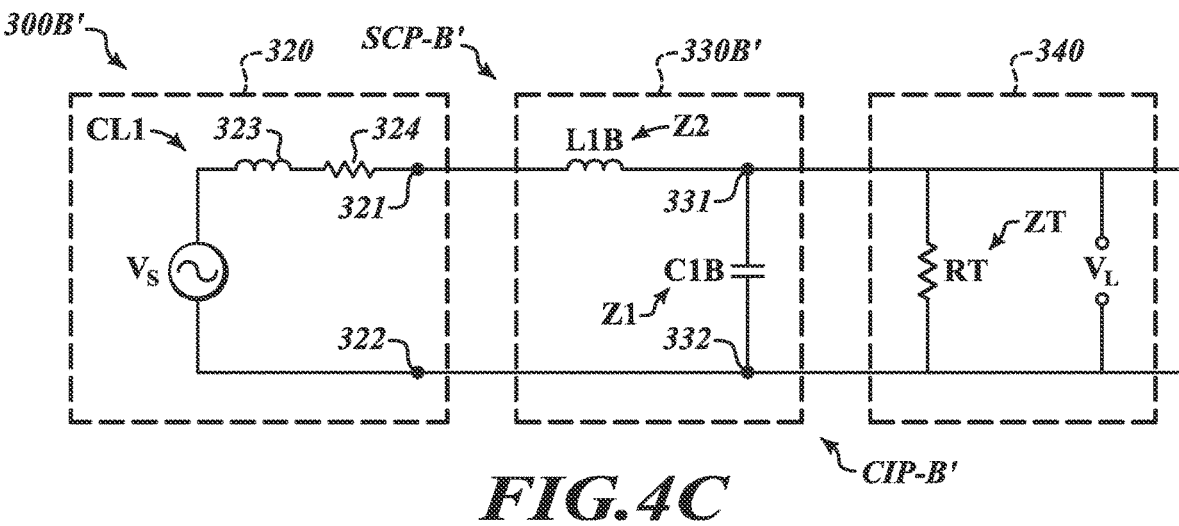

FIGS. 4A-4C are diagrams of implementations of the sensing coil circuitry portion of FIG. 3. The characteristics and operations described above with respect to FIG. 3 will be understood to apply to the implementations of FIGS. 4A-4C, unless otherwise described below. As illustrated in FIG. 4A, a sensing coil circuitry portion 300' includes a first sensing coil portion 320, an impedance circuit portion 330', and an input circuit portion 340. The first sensing coil portion 320 (e.g., including a first sensing coil CL1) has a first coil terminal 321, a second coil terminal 322 and a coil impedance (e.g., as will be described in more detail below).

A sensing circuit portion SCP' is configured to receive a first sensing coil signal from the first sensing coil portion 320. The sensing circuit portion SCP' includes the impedance circuit portion 330' and the input circuit portion 340. The impedance circuit portion 330' is connected to the first and second coil terminals 321 and 322. The impedance circuit portion 330' includes a first impedance circuit portion component Z1 and a second impedance circuit portion component Z2. The first impedance circuit portion component Z1 is coupled between a first impedance circuit portion node 331 and a second impedance circuit portion node 332. The second impedance circuit portion component Z2 is coupled between the first coil terminal 321 and the first impedance circuit portion node 331.

The input circuit portion 340 is connected to the first and second impedance circuit portion nodes 331 and 332. The input circuit portion 340 has an input impedance during operation. In various implementations the input impedance may correspond to the impedance of an input circuit portion component ZT (e.g., which may be a termination resistor RT, as will be described in more detail below). As illustrated, the first impedance circuit portion component Z1 is coupled in parallel with the input circuit portion component ZT, for which the components are effectively each coupled between the first impedance circuit portion node 331 and the second impedance circuit portion node 332. The input circuit portion 340 is configured to receive an oscillating sensing signal at the first and second impedance circuit portion nodes 331 and 332 (e.g., as resulting from the first sensing coil signal from the first sensing coil portion 320 as passing through the impedance circuit portion 330'). A combined impedance portion CIP' includes at least the impedance circuit portion 330' and the first sensing coil portion 320 and has a combined impedance presented to the input circuit portion 340 during operation.

FIGS. 4B and 4C are more specific implementations of the sensing coil circuitry portion 300' of FIG. 4A. FIG. 4B shows a sensing coil circuitry portion 300A' and FIG. 4C shows a sensing coil circuitry portion 300B'. As illustrated in FIGS. 4B and 4C, the sensing coil portion 320 has inductance and resistance (e.g., of the sensing coil CL1), which are represented as an inductive portion 323 and a resistive portion 324. Correspondingly, a coil impedance $Z_{Rx}$ (e.g., of the sensing coil CL1) of the sensing coil portion 320 comprises the inductance of the inductive portion 323 and the resistance of the resistive portion 324. As further illustrated in FIGS. 4B and 4C, in the input circuit portion 340 the input circuit portion component ZT is a termination resistor RT.

A voltage $V_S$ of the sensing coil portion 320 corresponds to the signal that is induced in the sensing coil CL1 by the operations of the inductive position transducer system (e.g., as described above with respect to FIGS. 1 and 2). More specifically, a drive signal is provided at an operating frequency to a first field generating coil portion (e.g., including a first field generating coil, such as field generating coil 122 of FIG. 2), for generating a changing magnetic flux that encompasses at least part of the first sensing coil portion 320

(i.e., including the first sensing coil CL1, which in one example could be the sensing coil 124 of FIG. 2). In various implementations, the voltage $V_S$ may correspond to a first sensing coil signal that results from the changing magnetic flux inducing current in the first sensing coil portion 320 (e.g., as modified by signal modulating elements of the scale member to varying degrees depending on the relative position along the scale member, and for which the first sensing coil signal correspondingly indicates a relative position between the first sensing coil portion 320 and the scale member, such as scale member 110 of FIG. 2, of the inductive position transducer system). A voltage $V_L$ of the input circuit portion 340 corresponds to the respective signal that results (e.g., across the termination resistor RT). In various implementations, the voltage $V_L$ may correspond to an oscillating sensing signal at the first and second impedance circuit portion nodes 331 and 332 (e.g., as resulting from the first sensing coil signal from the first sensing coil portion 320 as passing through the impedance circuit portion 330A' or 330B').

In the implementation of FIG. 4B, in the impedance circuit portion 330A' of the sensing coil circuitry portion 300A', the first impedance circuit portion component Z1 is an inductor L1A, and the second impedance circuit portion component Z2 is a capacitor C1A. In the implementation of FIG. 4C, in the impedance circuit portion 330B' of the sensing coil circuitry portion 300B', the first impedance circuit portion component Z1 is a capacitor C1B, and the second impedance circuit portion component Z2 is an inductor L1B. As will be understood by one skilled in the art, in certain implementations the configuration of FIG. 4B may be characterized as corresponding to a high-pass filter configuration, and the configuration of FIG. 4C may be characterized as corresponding to a low-pass filter configuration. As one specific numerical example, in certain implementations an operating frequency during operations for the configurations may be 20 MHz.

It will be appreciated that for applications where it is desirable to attenuate low frequencies (e.g., attenuating low frequency noise), the configuration of FIG. 4B may be selected/utilized. Alternatively, for applications where it is desirable to attenuate high frequencies (e.g., attenuating high frequency noise), the configuration of FIG. 4C may be selected/utilized. In certain applications, much of the noise that is desirable to attenuate may typically be in the higher frequencies, for which the configuration of FIG. 4C may be selected/utilized (e.g., as an alternative to certain other possible types of components/techniques for addressing noise, and with an added benefit of providing signal gain, such as will be described in more detail below with respect to FIG. 7B).

Figure 5A:
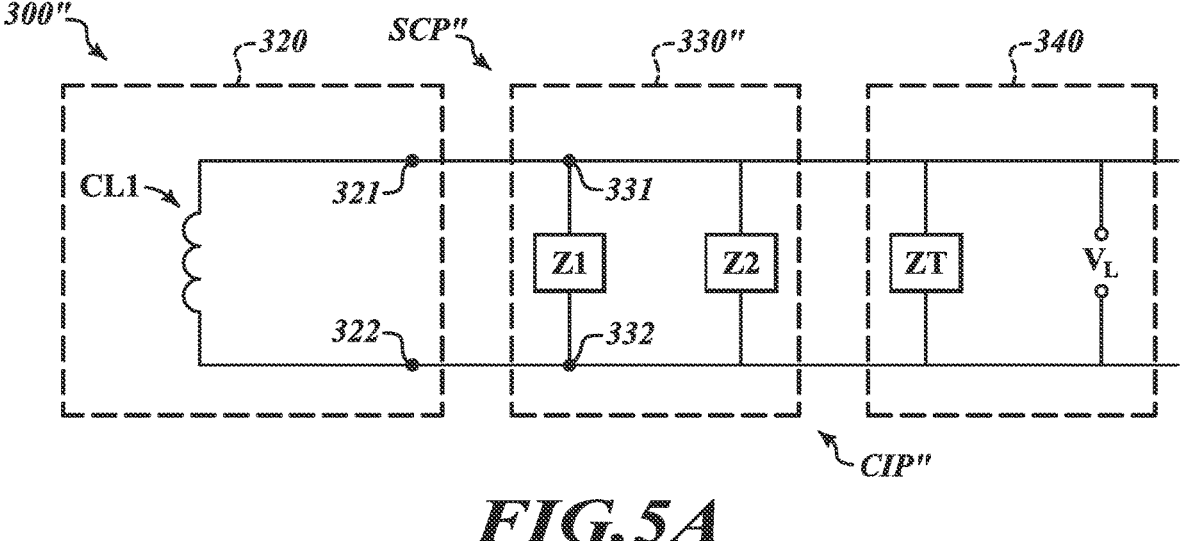
FIGS. 5A and 5B are diagrams of implementations of the sensing coil circuitry portion of FIG. 3 as including a first impedance circuit portion component as coupled between a first impedance circuit portion node and a second impedance circuit portion node and including a second impedance circuit portion component as coupled in parallel with the first impedance circuit portion component.
Figure 5B:
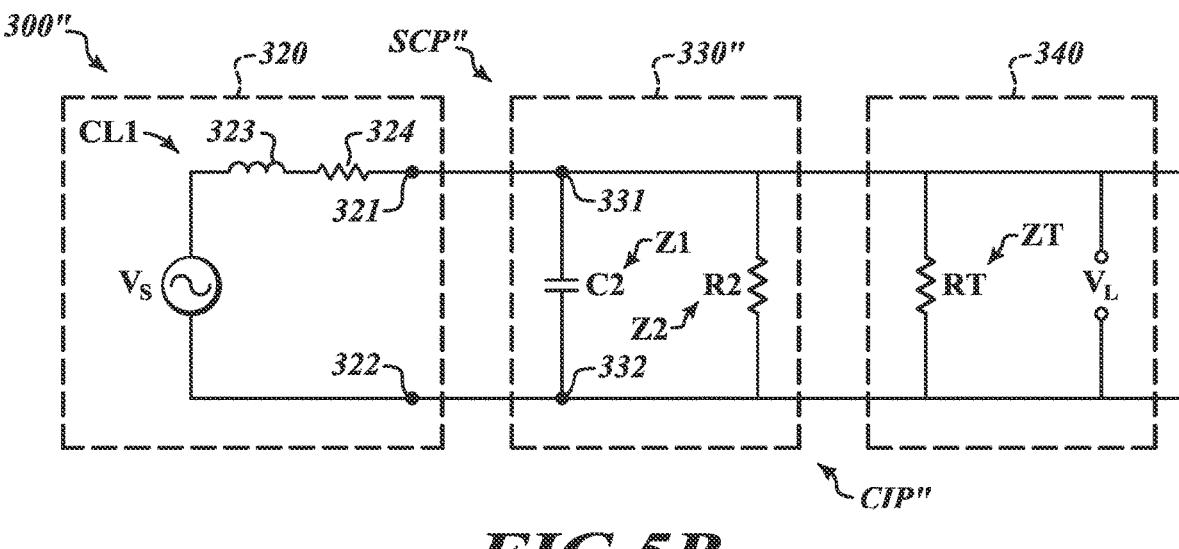

FIGS. 5A and 5B are diagrams of implementations of the sensing coil circuitry portion of FIG. 3. The characteristics and operations described above with respect to FIGS. 3 and 4A-4C will be understood to also apply to the implementations of FIGS. 5A and 5B, unless otherwise described below. As illustrated in FIG. 5A, a sensing coil circuitry portion 300" includes the first sensing coil portion 320, an impedance circuit portion 330", and the input circuit portion 340. The first sensing coil portion 320 and the input circuit portion 340 are the same as those described above with respect to FIG. 4A. A primary difference of the configuration of FIG. 5A as compared to the configuration of FIG. 4A is the impedance circuit portion 330" as compared to the impedance circuit portion 330', as will be described in more detail below.

In the configuration of FIG. 5A, a sensing circuit portion SCP'' is configured to receive a first sensing coil signal from the first sensing coil portion 320. The sensing circuit portion SCP'' includes the impedance circuit portion 330'' and the input circuit portion 340. The impedance circuit portion 330'' is connected to the first and second coil terminals 321 and 322. The impedance circuit portion 330'' includes a first impedance circuit portion component Z1 and a second impedance circuit portion component Z2. In the impedance circuit portion 330'', the first impedance circuit portion component Z1 is coupled between a first impedance circuit portion node 331 and a second impedance circuit portion node 332. The second impedance circuit portion component Z2 is also coupled between the first impedance circuit portion node 331 and the second impedance circuit portion node 332, so as to be coupled in parallel with the first impedance circuit portion component Z1.

As noted above, the input circuit portion 340 is the same as that of FIG. 4A (e.g., with similar connections and operations), and is connected to the first and second impedance circuit portion nodes 331 and 332. As illustrated, the first and second impedance circuit portion components Z1 and Z2 are each coupled in parallel with the input circuit portion component ZT, for which the components are effectively each coupled between the first impedance circuit portion node 331 and the second impedance circuit portion node 332. The input circuit portion 340 is configured to receive an oscillating sensing signal at the first and second impedance circuit portion nodes 331 and 332 (e.g., as resulting from the first sensing coil signal from the first sensing coil portion 320 as passing through the impedance circuit portion 330''). A combined impedance portion CIP'' includes at least the impedance circuit portion 330'' and the first sensing coil portion 320 and has a combined impedance presented to the input circuit portion 340 during operation.

FIG. 5B is a more specific implementation of the sensing coil circuitry portion 300'' of FIG. 5A. The first sensing coil portion 320 and the input circuit portion 340 of FIG. 5B are the same as those described above with respect to FIGS. 4B and 4C. A primary difference of the configuration of FIG. 5B as compared to the configurations of FIGS. 4B and 4C is the impedance circuit portion 330'' as compared to the impedance circuit portions 330A' and 330B', as will be described in more detail below.

In the implementation of FIG. 5B, in the impedance circuit portion 330'' of the sensing coil circuitry portion 300'', the first impedance circuit portion component Z1 is a capacitor C2, and the second impedance circuit portion component Z2 is a resistor R2. As will be described in more detail below (e.g., with respect to FIGS. 7A-7D), a desirable selection of the resistor R2 (i.e., which as illustrated is in parallel with the termination resistor RT of the input circuit portion 340) may enable certain other matching elements of the impedance circuit portion 330'' to be reduced to the single impedance circuit portion component Z1 (e.g., the capacitor C2). As will further be described in more detail below, such a configuration may have certain advantages (e.g., such as where the termination resistor RT may be relatively large, which could otherwise result in a relatively narrow bandwidth, but for which the inclusion of the resistor R2 may sacrifice some gain but may widen the bandwidth, and for which a wider bandwidth may be less sensitive to certain component tolerances and sample timings for the signals etc.).

Figure 6A:
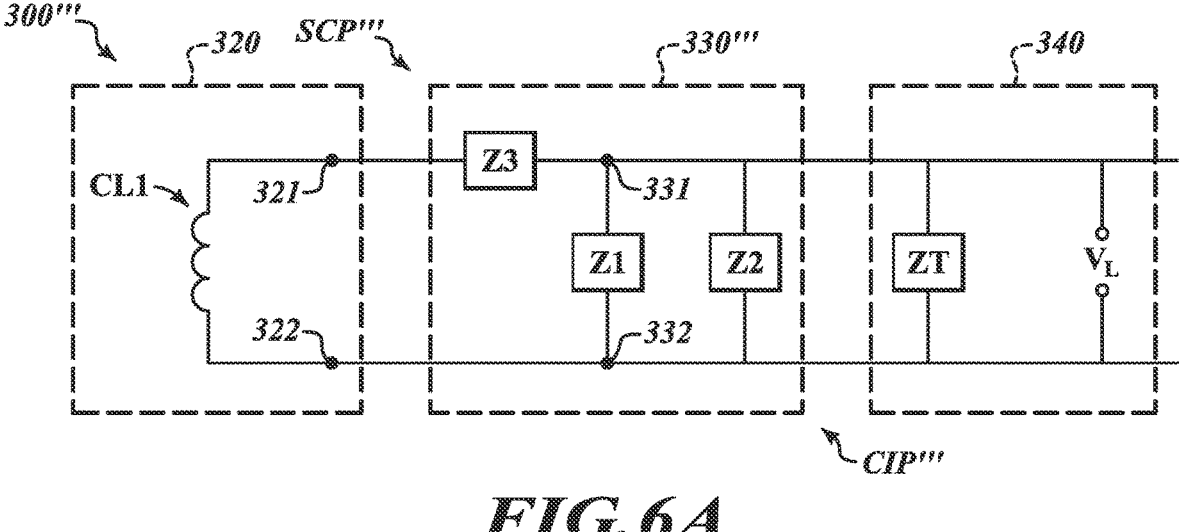
FIGS. 6A and 6B are diagrams of implementations of the sensing coil circuitry portion of FIG. 3 as including a first impedance circuit portion component as coupled between a first impedance circuit portion node and a second impedance circuit portion node and including a second impedance circuit portion component as coupled in parallel with the first impedance circuit portion component and including a third impedance circuit portion component as coupled between a first coil terminal and the first impedance circuit portion node.
Figure 6B:
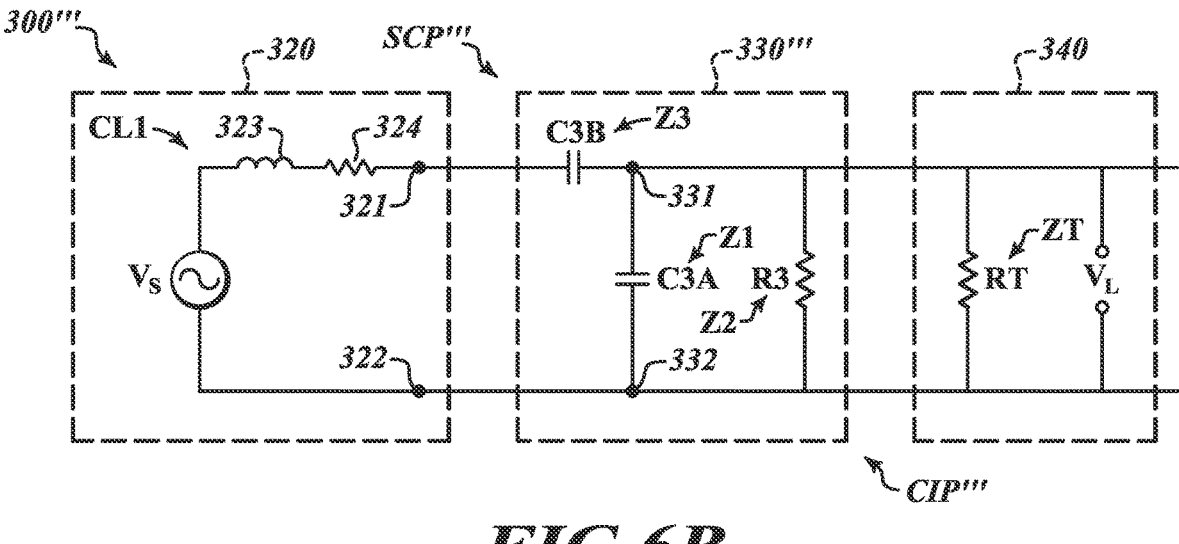

FIGS. 6A and 6B are diagrams of implementations of the sensing coil circuitry portion of FIG. 3. The characteristics and operations described above with respect to FIGS. 3, 4A-4C, 5A and 5B will be understood to also apply to the implementations of FIGS. 6A and 6B, unless otherwise described below. As illustrated in FIG. 6A, a sensing coil circuitry portion 300''' includes the first sensing coil portion 320, an impedance circuit portion 330''', and the input circuit portion 340. The first sensing coil portion 320 and the input circuit portion 340 are the same as those described above with respect to FIGS. 4A and 5A. A primary difference of the configuration of FIG. 6A as compared to the configurations of FIGS. 4A and 5A is the impedance circuit portion 330''' as compared to the impedance circuit portions 330' and 330'', as will be described in more detail below.

In the configuration of FIG. 6A, a sensing circuit portion SCP''' is configured to receive a first sensing coil signal from the first sensing coil portion 320. The sensing circuit portion SCP'' includes the impedance circuit portion 330''' and the input circuit portion 340. The impedance circuit portion 330''' is connected to the first and second coil terminals 321 and 322. The impedance circuit portion 330' includes a first impedance circuit portion component Z1, a second impedance circuit portion component Z2 and a third impedance circuit portion component Z3. In the impedance circuit portion 330'', the first impedance circuit portion component Z1 is coupled between a first impedance circuit portion node 331 and a second impedance circuit portion node 332. The second impedance circuit portion component Z2 is also coupled between the first impedance circuit portion node 331 and the second impedance circuit portion node 332 so as to be coupled in parallel with the first impedance circuit portion component Z1. The third impedance circuit portion component Z3 is coupled between the first coil terminal 321 and the first impedance circuit portion node 331.

As noted above, the input circuit portion 340 is the same as that of FIGS. 4A and 5A (e.g., with similar connections and operations), and is connected to the first and second impedance circuit portion nodes 331 and 332. As illustrated, the first and second impedance circuit portion components Z1 and Z2 are each coupled in parallel with the input circuit portion component ZT, for which the components are effectively each coupled between the first impedance circuit portion node 331 and the second impedance circuit portion node 332. The input circuit portion 340 is configured to receive an oscillating sensing signal at the first and second impedance circuit portion nodes 331 and 332 (e.g., as resulting from the first sensing coil signal from the first sensing coil portion 320 as passing through the impedance circuit portion 330''). A combined impedance portion CIP'' includes at least the impedance circuit portion 330''' and the first sensing coil portion 320 and has a combined impedance presented to the input circuit portion 340 during operation.

FIG. 6B is a more specific implementation of the sensing coil circuitry portion 300'' of FIG. 6A. The first sensing coil portion 320 and the input circuit portion 340 of FIG. 6B are the same as those described above with respect to FIGS. 4B, 4C and 5B. A primary difference of the configuration of FIG. 6B as compared to the configurations of FIGS. 4B, 4C and 5B is the impedance circuit portion 330'' as compared to the impedance circuit portions 330A', 330B' and 330'', as will be described in more detail below.

In the implementation of FIG. 6B, in the impedance circuit portion 330'' of the sensing coil circuitry portion 300'', the first impedance circuit portion component Z1 is a capacitor C3A, the second impedance circuit portion component Z2 is a resistor R3, and the third impedance circuit portion component Z3 is a capacitor C3B. As will be described in more detail below (e.g., with respect to FIGS. 7A-7D), the impedance circuit portion 330''' may have certain advantages similar to those of the impedance circuit portion 330' of FIG. 4A, and for which the addition of the resistor R3 may provide certain additional advantages (e.g., enabling a wider bandwidth, etc.) In various implementations, the configuration of FIG. 6B may be characterized as providing three degrees of freedom for which the values of the components may be selected so as to produce a desired resonant frequency, peak gain, and/or bandwidth (e.g., and having a corresponding a phase slope).

As noted above in relation to the examples of FIGS. 4A-4C, 5A-5B and 6A-6B, in various implementations the coil impedance $Z_{Rx}$ of the sensing coil portion 320 may include the impedance of the inductive portion 323 and the resistive portion 324 (e.g., of the sensing coil CL1). The impedance of the input circuit portion 340 may include the impedance of the input circuit portion component ZT (e.g., which may comprise a termination resistor RT), and may in some implementations be referenced as the input impedance. In various implementations, by approximately matching, or at least making closer to matching, the coil impedance $Z_{Rx}$ of the sensing coil portion 320 as combined with the impedance of the impedance circuit portion 330 to the impedance of the input circuit portion 340 (e.g., closer to matching the impedance of the input circuit portion 340 than the coil impedance of the sensing coil portion 320 by itself), the signal available to the input circuit portion 340 may be effectively increased (e.g., in some instances by a relatively significant amount). This results in an increased signal-to-noise (SNR) ratio and/or an ability to lower the field generating power (e.g., of a field generating portion, such as including one or more field generating coils, such as utilized for inducing the current in the sensing coil CL1 as part of the inductive position transducer operations such as described above with respect to FIG. 2).

As described herein, a combined impedance includes a combined reactance and a combined resistance of a sensing coil portion 320 and an impedance circuit portion 330. The components of the impedance circuit portion 330 may be configured such that the combined impedance is approximately matching, or at least closer to matching (e.g., closer to matching than the sensing coil portion 320 by itself), the impedance of the input circuit portion 340. In relation to the combined reactance, in various implementations, by inserting elements in the impedance circuit portion 330 for achieving the approximate matching, or at least making closer to matching, the combined reactance (e.g., at the operating frequency utilized during operations) including the reactance of the inductive portion 323 of the sensing coil portion 320, may be effectively reduced or eliminated (e.g., thus approximately matching, or at least making closer to matching, the reactance of the input circuit portion 340, which may have little to no reactance due to primarily having only the termination resistor RT). In addition, the combined resistance including the resistance of the resistive portion 324 of the sensing coil portion 320 may be effectively transformed to be approximately matching (e.g., approximately equal to), or at least closer to matching, the resistance of the input circuit portion 340 (e.g., including the resistance of the termination resistor RT). Also, the source voltage $V_S$ of the sensing coil portion 320 may appear relatively higher (e.g., due to characteristics that are closer to resonance, etc.). Such aspects may approximately maximize or otherwise increase the power transfer from the sensing coil portion 320 (e.g., including the sensing coil CL1) to the input circuit portion 340 (e.g., including the termination resistor RT).

Various techniques may be utilized for determining the elements (e.g., components) of the impedance circuit portion 330 for such purposes. For example, in one implementation complex number algebra may be utilized to determine the elements (e.g., with corresponding values) of the impedance circuit portion 330 (e.g., for achieving the approximate matching, or at least closer to matching, as noted above). In such an implementation, some general representations for impedance Z and admittance Y are indicated by EQUATIONS 1 and 2 below, respectively:

$$Z = R + jX \qquad \text{(Eq. 1)}$$

$$\text{where } j = (-1)^{1/2}.$$

$$Y = 1/Z = G + jB \qquad \text{(Eq. 2)}$$

In general, for the elements in the impedance circuit portions (e.g., such as in the examples of FIGS. 4A-4C, 5A-5B and 6A-6B), an insertion/inclusion of a series element corresponds to an addition of impedances, and an insertion/inclusion of a parallel element corresponds to an addition of admittances. In various implementations, two or more elements may be inserted/included in an impedance circuit portion.

Figures 7A, 7B:
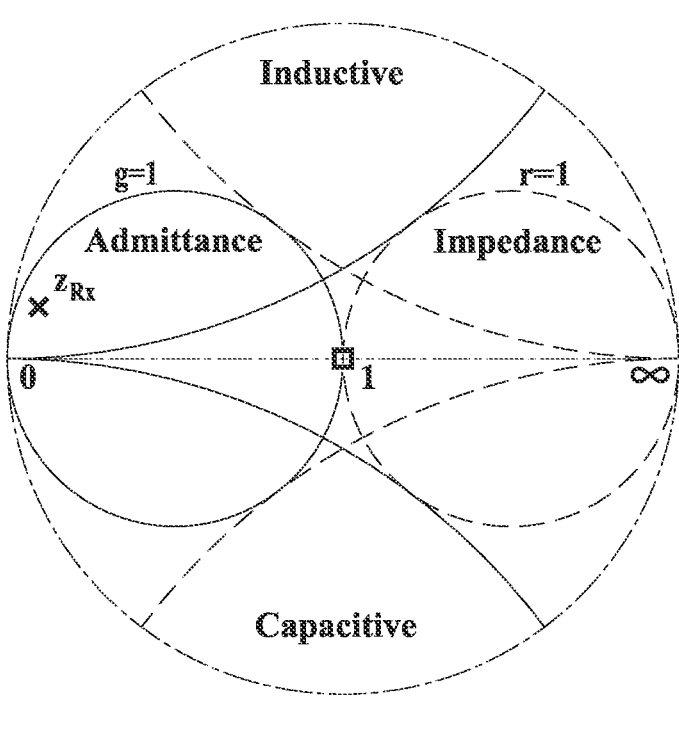
FIGS. 7A-7D are diagrams of Smith charts such as may be utilized for determining the elements of impedance circuit portions such as those of FIGS. 4A-4C, 5A-5B and 6A-6B.

FIGS. 7A-7D are diagrams of Smith charts such as may be utilized in some examples for determining the elements of impedance circuit portions such as those of FIGS. 4A-4C, 5A-5B and 6A-6B. In various implementations, such Smith charts may be utilized as aids to visualize matching solutions, and may comprise a polar plot in reflection coefficients. As illustrated in FIG. 7A, overlaid on the plots are the impedance and admittance grids (e.g., with impedance indicated by the correspondingly labeled interior dotted-line circle and the similar interior dotted-line curves, and the admittance indicated by the correspondingly labeled interior solid line circle and the similar interior solid line curves). In these examples, the charts are noted to be normalized, for which all impedances have been divided by characteristic impedance $Z_0$ which is purely resistive and set equal to the resistance of the input circuit portion component ZT (e.g., equal to the resistance of the termination resistor RT). The normalized characteristic impedance $z_0$ is represented by the small square at the center of each of the charts (e.g., and in various implementations may be characterized as representing a relative goal for the approximate matching such as described above). The following EQUATIONS 3-5 (e.g., in relation to EQUATIONS 1-2 above) indicate certain relationships in regard to the characteristic impedance $Z_0$.

$$z_0 = 1 + j0 \qquad \text{(Eq. 3)}$$

$$z = Z/Z_0 = r + jx \qquad \text{(Eq. 4)}$$

$$y = Z_0/Z = g + jb \qquad \text{(Eq. 5)}$$

Figure 7C:
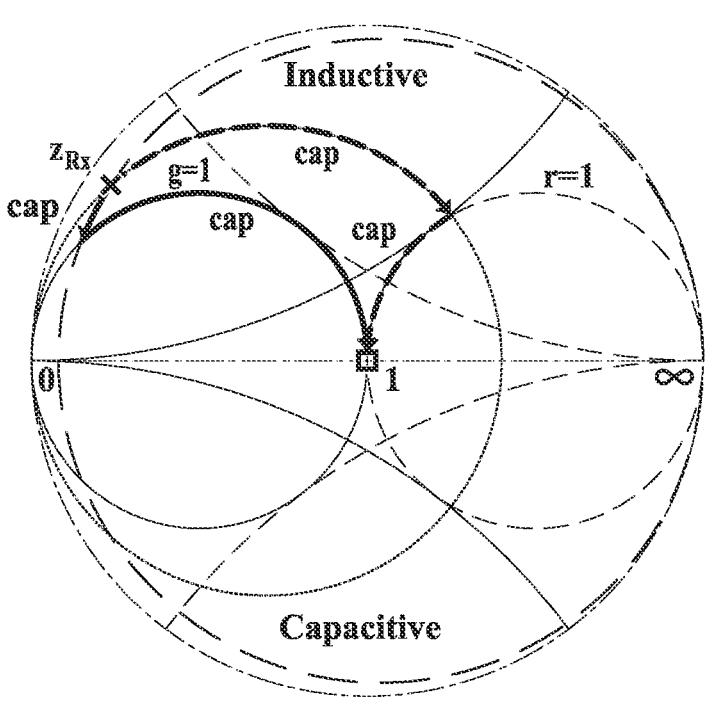
Figure 7D:
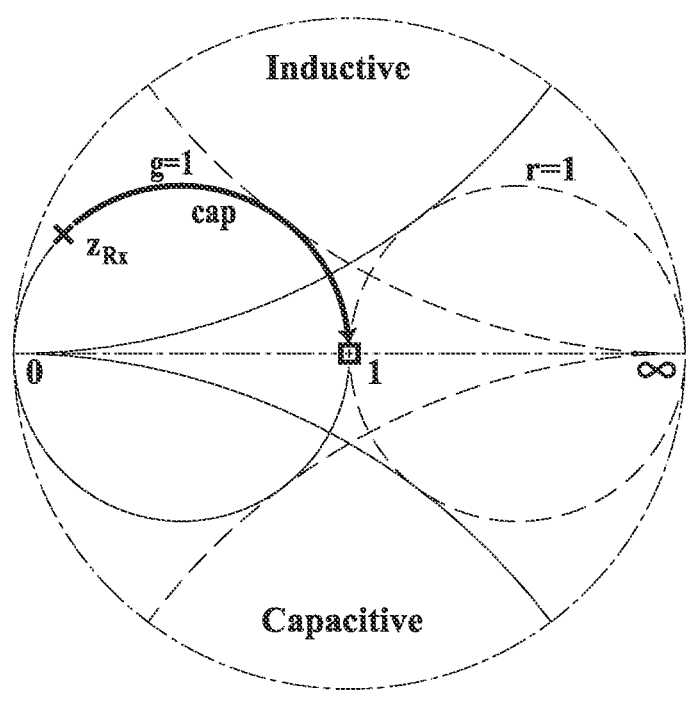

In FIG. 7A, the admittance interior solid line circle represents g=1, where g is the real part of admittance, and the impedance interior dotted-line circle represents r=1. In various implementations, for the examples as described herein, the admittance interior solid line circle may be regarded as one of the relatively more important curves in the chart. The coil impedance $z_{Rx}$ corresponds to the impedance of the sensing coil portion 320. As noted above, in various implementations, it may be considered desirable for the combined impedance of the sensing coil portion and the impedance circuit portion to be closer to (e.g., in some instances to approximately match) the characteristic impedance $z_0$ which is purely resistive and set equal to the resistance of the termination resistor RT (e.g., as corresponding to the small square at the center of the chart with the label "1", and for which according to EQUATION 3, $z_0=1+j0$). Thus, as will be described in more detail below with respect to the examples of FIGS. 7B-7D, the elements of the impedance circuit portions may be determined/selected so as to move the representations along respective curves of the Smith charts for having the combined impedance be closer to (e.g., in some instances to approximately match) the small central square (i.e., as representing the characteristic impedance $z_0$ as equal to the resistance of the termination resistor RT). The charts of FIGS. 7B-7D are noted to include all of the same illustrated features of the chart of FIG. 7A, as well as additional illustrated features, as will be described in more detail below.

In regard to FIG. 7B, the illustrated example chart in various implementations may correspond to the example impedance circuit portions of FIGS. 4A-4C, as will be described in more detail below. In these particular examples, the elements (e.g., components) of the impedance circuit portions include only capacitors and inductors. As a result, the impedance and admittance in the chart of FIG. 7B will only move on the constant r and g circles. Resistors are not used in these examples (e.g., for which resistors may introduce losses, but for which resistors may alternatively be used in certain other implementations, such as in relation to the example of FIG. 7D, as may correspond to the examples of FIGS. 5A, 5B, 6A and/or 6B, as will be described in more detail below). In the example of FIG. 7B, to convert between impedance z and reflection coefficient $\Gamma^-$, the following equations may be utilized. In various implementations, these may be used to produce a polar plot (e.g., in mathematics software, etc.).

$$\Gamma = (z-1)/(z+1) \qquad \text{(Eq. 6a)}$$

$$z = (1+\Gamma)/(1-\Gamma) \qquad \text{(Eq. 6b)}$$

The following include some specific numerical examples for the values of certain elements, such as the impedance $Z_{Rx}$ of the sensing coil portion 320 and the resistance of the termination resistor RT, and with an operating frequency of 20 MHz.

$$Z_{Rx} = (0.97 + j7.21)\Omega @ 20 \text{ MHz} \qquad \text{(Eq. 7)}$$

where 0.97 ohms is the impedance (e.g., including the resistance) of the resistive portion 324, and j7.21 ohms is the impedance (e.g., including the reactance) of the inductive portion 323. In general, the impedance of an inductor and/or inductive portion is $Z=j*\omega*L$, where $\omega=2*\pi*$frequency. In this example (e.g., where the operating frequency is 20 MHz and the inductance of the inductive portion 323 is L=57.4 nH), that calculation may be represented as $Z=j*2*\pi*20,000,000*57.4*10^\wedge(-9)=j7.21\Omega$.

The resistance of the termination resistor RT is 5000$\Omega$ (i.e., 500 ohms). Thus according to the above techniques $Z_0=5000\Omega$ and normalization is performed as follows:

$$z_{Rx} = Z_{Rx}/Z_0 = 0.00194 + j0.0144 \qquad \text{(Eq. 8)}$$

$$y_{Rx} = 1/z_{Rx} = 9.16 - j68.12 \qquad \text{(Eq. 9)}$$

Since in the example of FIG. 7B, g=9.16 corresponds to a circle inside of g=1 (e.g., illustrated in FIG. 7B as a smaller dotted line circle within the circle corresponding to g=1), in various implementations this indicates that reaching r=1 may generally not be achieved by adding a parallel element. This means that the first element must be in series with the sensing coil CL1 with the coil impedance $z_{Rx}$ (e.g., with the first element as corresponding to an impedance circuit portion component Z2 in the example of FIG. 4A). In various implementations, the combined impedance (e.g., including the impedance $z_{Rx}$) may be moved along the circle r=.00194 until achieving an intercept g=1. The circle r=0.00194 is represented in FIG. 7B as the relatively large dashed line circle (i.e., that is nearly as big as the chart) and for which the value is indicated in EQUATION 8. In the representation of FIG. 7B, the circle r=0.00194 intercepts the circle g=1 in two places, which indicates that there are two solutions.

As a first solution (e.g., "solution a"), such as corresponding to the example of FIG. 4B, a series capacitor C1A is inserted/included, which in the example of FIG. 7B moves the combined impedance towards the capacitive side of the chart so that g=1 (i.e., as indicated by the curved downward pointing arrow labeled "cap", which extends downward from $z_{Rx}$ and follows along the circle r=0.00194 to intersect the circle g=1). In addition, a parallel inductor L1A is inserted/included (e.g., as parallel to the input circuit portion component ZT), which in the example of FIG. 7B moves the combined admittance counterclockwise along the circle g=1 so that r=1 (i.e., as indicated by the curved rightward and upward pointing arrow labeled "ind", which extends from the end of the "cap" arrow and follows counterclockwise along the circle g=1 to approximately intersect the circle r=1 at the small central square "1"). As noted above, the small central square corresponds to the normalized characteristic impedance $z_0$ as corresponding to the termination resistor RT, for which the configuration of FIG. 4B (e.g., with the characteristics as indicated in FIG. 7B) thus at least approximately achieves a desired matching, such as for the reactance which may be relatively minimal (e.g., with the combined reactance relatively reduced and/or eliminated), such as described above.

As a second solution (e.g., "solution b"), such as corresponding to the example of FIG. 4C, a series inductor L1B is inserted/included, which in the example of FIG. 7B moves the combined impedance more towards the inductive side of the chart so that g=1 (i.e., as indicated by the curved upward pointing dashed-line arrow labeled "ind", which extends upward from $z_{Rx}$ and follows along the circle r=0.00194 to intersect the circle g=1). In addition, a parallel capacitor C1B is inserted/included, which in the example of FIG. 7B moves the combined admittance clockwise along g=1 so that r=1 (i.e., as indicated by the curved rightward and downward pointing dashed-line arrow labeled "cap", which extends from the end of the "ind" arrow and follows clockwise along the circle g=1 to approximately intersect the circle r=1 at the small central square "1"). As noted above, the small central square "1" corresponds to the normalized characteristic impedance $z_0$ as corresponding to the termination resistor RT, for which the configuration of FIG. 4C (e.g., with the characteristics as indicated in FIG. 7B) thus at least approximately achieves a desired matching, such as for the reactance which may be relatively minimal (e.g., with the combined reactance relatively reduced and/or eliminated), such as described above.

In relation to the above concepts, various calculations as described below illustrate the determinations of values for certain of the components. As an initial calculation, a series reactance $x_1$ may be computed so that the resulting admittance has g=1. The following equation assumes capacitive reactance:

$$1/(z_{Rx} - jx_1) = 1 + jb \qquad \text{(Eq. 10)}$$

Utilizing known algebraic techniques, two solutions may be found as indicated below:

$$x_1 = x_{Rx} \pm (r - r^2)^{1/2} = 0.0584 \text{ or} - 0.0296 \qquad \text{(Eq. 11)}$$

The positive result represents the reactance of capacitor C1A (i.e., of FIG. 4B), while the negative result represents the reactance of inductor L1B (i.e., of FIG. 4C), with example values as indicated below.

$$C1A = 1/(0.0584 \cdot \omega Z_0) = 272 \text{ pF} \qquad \text{(Eq. 12)}$$

$$L1B = -(-0.0296)Z_0/\omega = 118 \text{ nH} \qquad \text{(Eq. 13)}$$

Admittance after inserting $x_1$ is indicated below.

$$y_1 = 1/(Z_{Rx} - jx_1) = 1 \pm j22.68 \qquad \text{(Eq. 14)}$$

Parallel elements with susceptance b=±22.68 are indicated below, with the parallel elements in these examples including inductor L1A (i.e., of FIG. 4B) and capacitor C1B (i.e., of FIG. 4C), with example values as indicated below.

$$L1A = Z_0/(22.68\omega) = 175 \text{ nH} \qquad \text{(Eq. 15)}$$

$$C1B = 22.68/(\omega Z_0) = 361 \text{ pF} \qquad \text{(Eq. 16)}$$

With example values such as those above, an example voltage gain of both the configuration of FIG. 4B and the configuration of FIG. 4C may be approximately 11.35 (21.1 dB) (e.g., as may be compared to a gain of 1.0 of an "unmatched" circuit without the impedance circuit portion 330 included). Thus, a relatively significant increase in the gain may be achieved utilizing the configurations as disclosed herein. In various implementations, a frequency response for each configuration may be computed based on a voltage divider formula, such as indicated below.

$$V_L = V_S(Z_b(\omega))/(Z_b(\omega) + Z_a(\omega)) \qquad \text{(Eq. 17)}$$

In EQUATION 17, the voltages $V_L$ and $V_S$ may be as indicated in FIGS. 4B and 4C, and $Z_b(\omega)$ may represent a combination of the circuit elements L1A and RT of FIG. 4B, or C1B and RT of FIG. 4C, and $Z_a(\omega)$ may represent a combination of the circuit elements CL1 and C1A of FIG. 4B, or CL1 and L1B of FIG. 4C, respectively. In the configuration of FIG. 4B, it will be appreciated that low frequencies may be attenuated, and as some example values the 3 dB bandwidth may be 242 KHz, and the phase slope may be −0.756 deg/10 KHz. In the configuration of FIG. 4C, it will be appreciated that high frequencies may be attenuated (e.g., as may be advantageous for suppressing certain electromagnetic interference from external sources, etc.), the 3 dB bandwidth may be 336 KHz, and the phase slope may be −0.543 deg/10 KHz. Thus, it will be appreciated that the configuration of FIG. 4B or 4C (or configurations similar thereto) may be selected for certain applications depending on the needed characteristics (e.g., utilizing the configuration of FIG. 4B or 4C for attenuating low frequencies or high frequencies, respectively).

FIG. 7C illustrates a chart similar to that of FIG. 7B, with certain differences as noted below. As a primary difference, in the example of FIG. 7C, the coil impedance $z_{Rx}$ is indicated as being outside of the circle g=1. In various implementations, this may indicate four possible solutions since both g=1 and r=1 are reachable. Two of the solutions allow use of only capacitors in the impedance circuit portion, and the other two solutions will include inductors. The potential two solutions including only capacitors are described in more detail below.

In relation to FIG. 4A, for the two solutions utilizing only capacitors, in the impedance circuit portion 330' of FIG. 4A, the components Z1 and Z2 are both capacitors. As a first solution, a series capacitor is inserted/included (e.g., as the component Z2 in FIG. 4A), which in the example of FIG. 7C moves the combined impedance downward so that g=1 (i.e., as indicated by the curved downward pointing arrow labeled "cap", which extends downward from $z_{Rx}$ and follows along the circle r=0.00194 to intersect the circle g=1). In addition, a parallel capacitor is inserted/included (e.g., as the component Z1 in FIG. 4A and as parallel to the input circuit portion component ZT), which in the example of FIG. 7C moves the combined admittance clockwise along the circle g=1 so that r=1 (i.e., as indicated by the curved rightward and downward pointing arrow labeled "cap", which extends from the end of the first "cap" arrow and follows clockwise along the circle g=1 to approximately intersect the circle r=1 at the small central square "1"). As noted above with respect to FIG. 7B, such characteristics at least approximately achieve a desired matching, such as for the reactance which may be relatively minimal (e.g., with the combined reactance relatively reduced and/or eliminated), such as described above.

As a second solution, a parallel capacitor is inserted/included (e.g., as a second impedance circuit portion component Z2), which in the example of FIG. 7C moves the combined impedance towards the right to reach the circle r=1 (i.e., as indicated by the curved dashed-line arrow labeled "cap", which extends from $z_{Rx}$ to intersect the circle r=1). In addition, a series capacitor is inserted/included (e.g., as a first impedance circuit portion component Z1, with component Z2 in parallel and component Z1 in series on the right side of component Z2, as compared with the example of FIG. 4A in which component Z2 is in series and component Z1 is in parallel with component ZT, but otherwise with similar connections of the impedance circuit portions such as including with the component ZT as coupled/connected between the first and second impedance circuit portion nodes 331 and 332, etc.) This configuration of the second solution (i.e., in the example of FIG. 7C) moves the combined admittance counterclockwise along r=1 to reach the central square "1" (i.e., as indicated by the curved downward pointing dashed-line arrow labeled "cap", which extends from the end of the other "cap" arrow and follows counterclockwise along the circle r=1 to the small central square "1").

In regard to FIG. 7D, the illustrated example chart in various implementations may correspond to the example impedance circuit portions of FIGS. 5A and 5B, as will be described in more detail below. As noted above, one difference from the configurations of FIGS. 4B and 4C, is that in the configuration of FIG. 5B the impedance circuit portion 330" includes a resistor R2 (e.g., as a second impedance circuit portion component Z2). In some implementations, the resistor R2 may be characterized as essentially modifying the effective input impedance of the input circuit portion 340 (e.g., for which the resistors R2 and RT in parallel result in a combined resistance that is lower than that of the resistor RT by itself). In some implementations, such as for the chart of FIG. 7D, this may be regarded as lowering the effective characteristic impedance $Z_0$ which is purely resistive and set equal to the effective input resistance (e.g., which may in this example include the combined resistance of the resistor R2 and the termination resistor RT in parallel). As noted above, the chart is normalized, for which all impedances have been divided by the characteristic impedance $Z_0$. As above, the normalized characteristic impedance $z_0$ is represented by the small square "1" at the center of the chart.

In further regard to the chart of FIG. 7D, g=1 is set in this equation for admittance.

$$Y = Z_0/Z_{Rx} = 1 + jb \qquad \text{(Eq. 18)}$$

Which has the solution:

$$Z_0 = R + (\omega L)^2/R \qquad \text{(Eq. 19)}$$
$$b = -\omega L/R \qquad \text{(Eq. 20)}$$

For which the parallel resistor R2 of the configuration of FIG. 5B is:

$$R2 = 1/(1/Z_0 - 1/RT) \qquad \text{(Eq. 21)}$$

Lastly, the parallel capacitor C2 is inserted for at least approximate matching:

$$C2 = -b/(\omega Z_0) \qquad \text{(Eq. 22)}$$

As some specific example values, in one configuration the resistance of R2 may be 61.25 ohms, and the capacitance of capacitor C2 may be 1.084 nF (e.g., for which the values of the components may be calculated using techniques similar to those described above). The values of the other components may be similar to those in the examples above (e.g., the inductive portion 323 having an inductance of 57.4 nH, the resistive portion 323 having a resistance of 0.97 ohms, the termination resistor RT having a resistance of 500 ohms, etc.) In various implementations, the inclusion of a parallel resistor (e.g., resistor R2) may be particularly useful when the resistance of the termination resistor RT may be relatively high (e.g., such as equal to 4 Kohms). In various implementations, when the resistance of the termination resistor RT is significantly larger than the resistance of the resistive portion 324, then matching component reactance may become very large and relatively sensitive to tolerance. In certain implementations (e.g., as illustrated in FIG. 6B), the parallel resistor R2 can be combined with the configuration of FIG. 4A (e.g., such as where two capacitors are utilized as the components Z1 and Z2 as indicated in the chart of FIG. 7C), and targeting a desired gain, as will be described in more detail below.

With the above example values for the components (e.g., and with the combined resistance of resistor R2 in parallel with the termination resistor RT), the effective characteristic impedance $Z_0$ is reduced to 54.6 ohms. In this example, this is a relatively large reduction from the original 500 ohm value of the termination resistor RT by itself, but the voltage gain is still 3.75 (11.5 dB). The reduction in effective characteristic impedance $Z_0$ will also reduce thermal noise in the termination resistor RT. As some further example values in relation to the configuration of FIG. 5B, the 3 dB bandwidth may be 872 KHz and the phase slope may be −0.213 deg/10 KHz.

In an alternative implementation where a goal is resonance rather than approximate matching, a configuration similar to that of FIG. 4C (e.g., except without the series inductor L1B) may be utilized, in which the parallel capacitor C1B is utilized to set the resonant peak voltage at the target frequency. It is noted that matching techniques such as those described above may produce configurations with relatively higher voltage gains than such configurations directed more toward resonance. For example, as described above the configuration of FIG. 4C in one specific implementation may have a voltage gain of approximately 11.35 (21.1 dB), while a similar resonance version as described in more detail below (e.g., without the inductor L1B and with a different value for the parallel capacitor C1B) may have a voltage gain of approximately 6.75 (16.5 dB), for which the voltage gain of the resonance version is only about 60 percent of the voltage gain of the matching version.

As noted above, in a resonance version of a configuration similar to that of FIG. 4C (e.g., as including the parallel capacitor C1B but not including the series inductor L1B), the parallel capacitor C1B would be utilized to set the resonant peak voltage at the target frequency. For such a version, a simplified technique for calculating an approximate value of the parallel capacitor C1B may utilize a classical equation for resonating an LC tank circuit (for which as part of the simplification the impact of the resistive portion 324 and of the termination resistor RT on the resonant peak are ignored in the following simplified equations, which follow the general form of $\omega=1/(LC)^{1/2}$ for an inductance L and capacitance C of an LC tank circuit).

$$\omega = 1/((L_{323})(C1B))^{1/2} \qquad \text{(Eq. 23)}$$

where $L_{323}$ is the inductance of the inductive portion 323, and which in accordance with the other example values as noted above where $\omega=2*\pi*$frequency, for which the operating frequency is 20 MHz, and the inductance of the inductive portion 323 is L=57.4 nH, then:

$$C1B = 1/((\omega^2)(L_{323})) = 1.104 \text{ nF} \qquad \text{(Eq. 24)}$$

As part of a more detailed calculation of the value of C1B for achieving resonance (e.g., which takes into account the impact of the resistive portion 324 and of the termination resistor RT and will set the derivative of the voltage with respect to frequency to zero and utilizing relatively complex algebra as will be understood by one skilled in the art), a more precise value in this example may be determined as C1B=1.094 nF (e.g., which may put the resonant peak exactly at the target frequency). Utilizing this value for such an example resonance version may result in a voltage gain of approximately 6.75 (16.5 dB) at the operating frequency of 20 MHz. A version utilizing the value of C1B=1.104 nF from EQUATION 24 (which is noted to be relatively close to the more precise value) may result in a slightly lower voltage gain and with a voltage peak slightly off from the target frequency. In any case, as noted above, in these particular examples the voltage gains of such resonance versions may be relatively less (e.g., 60 percent or less) than the voltage gain of the version formed using matching principles as described above with respect to FIG. 4C (i.e., with the voltage gain of approximately 11.35 (21.1 dB)).

In further regard to configurations utilizing matching principles such as those described above, FIG. 6B is noted to illustrate another configuration with certain desirable characteristics. In certain implementations, the configuration of FIG. 6B may be described as combining a configuration of FIG. 4A (i.e., with capacitors as the components Z1 and Z2), with a parallel resistor R3 (e.g., similar to the parallel resistor R2 of FIG. 5B). It will be appreciated that a configuration such as that of FIG. 6B may have characteristics such as a wider bandwidth and a reduced phase slope (e.g., in comparison to the other example configurations as described above).

With regard to the configuration of FIG. 6B, as some specific numerical examples, if the resistor R3 has a value of 51 ohms, and with the combined resistance of resistor R3 in parallel with the termination resistor RT, the effective characteristic impedance $Z_O$ is reduced to 46.3 ohms. Such a configuration, similar to the examples described above with respect to the chart of FIG. 7C, may move/result in $z_{Rx}$ being outside of the circle g=1. Correspondingly, the components Z1 and Z3 of FIG. 6A may be implemented as capacitors (e.g., as described above with respect to the chart of FIG. 7C and as illustrated in FIG. 6B for the respective capacitors C3A and C3B).

As some specific example values, in one configuration the capacitance of capacitor C3A may be 1.175 nF, and the capacitance of capacitor C3B may be 13.7 nF (e.g., for which the values of the components may be calculated using techniques similar to those described above with respect to FIG. 7C, etc.). The values of the other components may be similar to those in the examples above (e.g., the inductive portion 323 having an inductance of 57.4 nH, the resistive portion 323 having a resistance of 0.97 ohms, the termination resistor RT having a resistance of 500 ohms, the resistor R3 having the resistance of 51 ohms, etc.) With such example values, an example voltage gain of the configuration of FIG. 6B may be approximately 3.45 (10.8 dB), the 3 dB bandwidth may be 2.04 MHz, and the phase slope may be −0.089 deg/10 KHz. It is noted that in various implementations the configuration of FIG. 6B may effectively widen the bandwidth and reduce the phase slope (e.g., in relation to the other example configurations as described above). For example, as noted above in regard to certain possible example component values, the configuration of FIG. 4B may have characteristics for which the 3 dB bandwidth may be 242 KHz, and the phase slope may be −0.756 deg/10 KHz, the configuration of FIG. 4C may have characteristics for which the 3 dB bandwidth may be 336 KHz, and the phase slope may be −0.543 deg/10 KHz, and the configuration of FIG. 5B may have characteristics for which the 3 dB bandwidth may be 872 KHz and the phase slope may be −0.213 deg/10 KHz (e.g., all of which are noted to have narrower bandwidths and steeper phase slopes than the example configuration of FIG. 6B as described above).

The following includes some comparisons of some of the features of the example configurations of FIGS. 4A-4C and 6A-6B as described above (e.g., for which different features may be desirable depending on a particular application). The example configurations of FIGS. 4A-4C are noted to have the highest gains of the examples (e.g., in some implementations representing an upper limit on a gain that can be achieved), and for which the configurations also generally have the smallest bandwidth and the steepest phase slopes. The example configurations of FIGS. 6A-6B generally illustrate that component values may be selected to generally target a particular desired gain, or bandwidth, or slope (e.g., with a maximum gain as indicated by the examples of FIG. 4A-4C as noted above). In various implementations, a relatively large bandwidth (e.g., such as that of the example configuration of FIG. 6B) may help minimize issues resulting from slight shifts in the resonant peak (e.g., such as due to component tolerances and/or slight changes/differences in the characteristics of the sensing coil CL1 including in the inductive portion 323 and/or the resistive portion 324, such as may be due to the gap variation and/or position on the scale of the overall inductive position transducer, such as described above with respect to FIG. 2, etc.).

The example configuration of FIG. 6B in particular is noted to have the impedance circuit portion 330" include three relatively inexpensive components (e.g., the capacitors C3A and C3B, and the resistor R3), for which the configuration may be repeated for the different phases of the overall inductive position transducer (e.g., as described above with respect to FIG. 2). In certain implementations, the utilization of only capacitors and resistors (e.g., such as illustrated in FIG. 6B) may be preferable over configurations utilizing inductors (e.g., such as illustrated in FIGS. 4A and 4B), such as due to the component tolerances of capacitors and resistors in some implementations generally being better/more consistent than those of inductors, etc. In various implementations, it may be desirable to utilize relatively low temperature coefficient (TC) components (e.g., such as NPO ceramic capacitors, etc.) It is noted that in general the maximum possible gain may increase when ωL/R increases and/or when $RT/R_{324}$ increases (e.g., where $R_{324}$ is the resistance of the resistive portion 324).

As noted above, as a specific numerical example, in various implementations for any of the configurations as described herein, the operating frequency may be 20 MHz. In relation to matching techniques such as those described above, it may generally be desirable to utilize such a relatively high operating frequency (e.g., for which the matching techniques may be relatively more effective at relatively high operating frequencies for the desired benefits). It is also noted that configurations having/utilizing a relatively large/high value termination resistor RT may have relatively significant flexibility for the matching techniques.

FIG. 8 is a flow diagram illustrating an exemplary routine 800 for operating an inductive position transducer system (e.g., which includes an impedance circuit portion such as that described herein). At a block 810, a drive signal is provided at an operating frequency to a first field generating coil portion for generating a changing magnetic flux that encompasses at least part of a first sensing coil portion, the first sensing coil portion having a first coil terminal, a second coil terminal and a coil impedance. At a block 820, at a sensing circuit portion, a first sensing coil signal is received from the first sensing coil portion that indicates a relative position between the first sensing coil portion and a scale member. In various implementations, the first sensing coil signal results from the changing magnetic flux inducing current in the first sensing coil portion, as modified by signal modulating elements of the scale member to varying degrees depending on the relative position along the scale member, and for which the first sensing coil signal correspondingly indicates a relative position between the first sensing coil portion and the scale member.

The sensing circuit portion comprises an impedance circuit portion connected to the first and second coil terminals, and an input circuit portion. The impedance circuit portion comprises a first impedance circuit portion component and a second impedance circuit portion component. The first impedance circuit portion component is coupled between a first impedance circuit portion node and a second impedance circuit portion node. The second impedance circuit portion is at least one of: coupled between the first impedance circuit portion node and the second impedance circuit portion node; or coupled between the first coil terminal and the first impedance circuit portion node. The input circuit portion is connected to the first and second impedance circuit portion nodes, the input circuit portion having an input impedance during operation. The input circuit portion is configured to receive an oscillating sensing signal at the first and second impedance circuit portion nodes (e.g., as resulting from the first sensing coil signal as received at the sensing circuit portion). A combined impedance portion comprising at least the impedance circuit portion and the first sensing coil portion has a combined impedance presented to the input circuit portion during operation.

In various implementations, the method may further include determining a relative position between the first sensing coil portion and the scale member (e.g., as corresponding to a relative position between a read head and the scale member), based at least in part on the received oscillating sensing signal at the first and second impedance circuit portion nodes. In various implementations, a determining of the relative position between the first sensing coil portion and the scale member may correspond to/be achieved by determining a relative position between a read head and the scale member. As described above, a read head may include a plurality of sensing coil portions and impedance circuit portions (e.g., sensing coil portions 120-*n* and impedance circuit portions 130-*n* of FIG. 2), for which a determination of a relative position between the read head and the scale member (e.g., scale 110 of FIG. 2) may be based at least in part on a processing of and/or otherwise combining a plurality of oscillating sensing signals as received at a plurality of corresponding first and second impedance circuit portion nodes.

The following describes certain exemplary embodiments of the present disclosure with various features and elements annotated with reference numerals found in FIGS. 1-8. It should be understood that the reference numerals are added to indicate exemplary embodiments, and the features and elements are not limited to the particular embodiments illustrated in FIGS. 1-8.

An inductive position transducer system 100 is provided, including an inductive position transducer 108 and a sensing circuit portion SCP. In various implementations, a sensing circuit portion SCP is provided for each sensing coil portion 120-*n* (e.g., for each sensing coil) of the inductive position transducer 108.

The inductive position transducer 108 comprises at least a first sensing coil portion 320/120A1 (e.g., with a first sensing coil) having a first coil terminal 321, a second coil terminal 322 and a coil impedance. The sensing circuit portion SCP is configured to receive a first sensing coil signal from the first sensing coil portion 320. The sensing circuit portion SCP comprises an impedance circuit portion 330/130-A1 and an input circuit portion 340 (e.g., of an application-specific integrated circuit (ASIC)).

The impedance circuit portion 330 is connected to the first and second coil terminals 321 and 322. The impedance circuit portion 330 comprises a first impedance circuit portion component Z1 and a second impedance circuit portion component Z2. The first impedance circuit portion component Z1 is coupled between a first impedance circuit portion node 331 and a second impedance circuit portion node 332. The second impedance circuit portion component Z2 is at least one of: coupled between the first impedance circuit portion node 331 and the second impedance circuit portion node 332; or coupled between the first coil terminal 321 and the first impedance circuit portion node 331.

The input circuit portion 340 (e.g., of the ASIC) is connected to the first and second impedance circuit portion nodes 331 and 332. The input circuit portion 340 has an input impedance during operation (e.g., during which an operating frequency is utilized), wherein the input circuit portion 340 is configured to receive an oscillating sensing signal at the first and second impedance circuit portion nodes 331 and 332. A combined impedance portion CIP comprising at least the impedance circuit portion 330 and the first sensing coil portion 320 has a combined impedance presented to the input circuit portion 340 (e.g., of the ASIC) during operation.

In various implementations, the sensing coil portion 320 comprises a sensing coil CL1 which comprises the first coil terminal 321, the second coil terminal 322 and the coil impedance. The sensing coil CL1 comprises an inductive portion 323 and a resistive portion 324. The input impedance of the input circuit portion 340 comprises the impedance of an input circuit portion component ZT that is coupled between the first impedance circuit portion node 331 and the second impedance circuit portion node 332. In various implementations, the input circuit portion component ZT comprises a resistor RT. In various implementations (e.g., as illustrated in FIGS. 6A and 6B), the impedance circuit portion 330′″ may further comprise a third impedance circuit portion component Z3 that is coupled between the first coil terminal 321 and the first impedance circuit portion node 331. In various implementations, the third impedance circuit portion component Z3 comprises a capacitor C3B.

In various implementations, the sensing coil portion 320 comprises an inductive portion 323 that has an associated reactance during operation that would otherwise be presented to the input circuit portion 340 but for which a majority of the reactance is eliminated in the combined impedance as a result of the inclusion of the impedance circuit portion 330 (e.g., of the configurations of FIGS. 4A-4C, 5A-5B and 6A-6B) in the combined impedance portion CIP. In various implementations, one or more impedance circuit portion components of the impedance circuit portion are configured for the eliminating of the majority of the reactance of the inductive portion of the sensing coil portion.

It will be appreciated that the principles disclosed and claimed herein may be readily and desirably combined with various features disclosed in the incorporated references. The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An inductive position transducer system, comprising:
an inductive position transducer comprising a first sensing coil portion having a first coil terminal, a second coil terminal and a coil impedance; and
a sensing circuit portion configured to receive a first sensing coil signal from the first sensing coil portion, the sensing circuit portion comprising:
an impedance circuit portion connected to the first and second coil terminals, the impedance circuit portion comprising:
a first impedance circuit portion component, wherein the first impedance circuit portion component is coupled between a first impedance circuit portion node and a second impedance circuit portion node; and
a second impedance circuit portion component, which is at least one of:
coupled between the first impedance circuit portion node and the second impedance circuit portion node; or
coupled between the first coil terminal and the first impedance circuit portion node; and
an input circuit portion connected to the first and second impedance circuit portion nodes, the input circuit portion having an input impedance during operation, wherein the input circuit portion is configured to receive an oscillating sensing signal at the first and second impedance circuit portion nodes;
wherein:
a combined impedance portion comprising at least the impedance circuit portion and the first sensing coil portion has a combined impedance presented to the input circuit portion during operation; and
the inductive position transducer system is configured such that at least one of:
the first sensing coil portion comprises an inductive portion that has an associated reactance during operation that would otherwise be presented to the input circuit portion but for which a majority of the reactance is eliminated in the combined impedance as a result of the inclusion of the impedance circuit portion in the combined impedance portion; or
the first impedance circuit portion component comprises a capacitor and the second impedance circuit portion component comprises a resistor and is coupled between the first impedance circuit portion node and the second impedance circuit portion node.

2. The system of claim 1, wherein the first sensing coil portion comprises a sensing coil which comprises the first coil terminal, the second coil terminal and the coil impedance.

3. The system of claim 2, wherein the sensing coil comprises an inductive portion and a resistive portion.

4. The system of claim 1, wherein the input impedance of the input circuit portion comprises the impedance of an input circuit portion component that is coupled between the first impedance circuit portion node and the second impedance circuit portion node.

5. The system of claim 4, wherein the input circuit portion component comprises a resistor.

6. The system of claim 1, wherein the second impedance circuit portion component is coupled between the first impedance circuit portion node and the second impedance circuit portion node.

7. The system of claim 6, wherein the impedance circuit portion further comprises a third impedance circuit portion component that is coupled between the first coil terminal and the first impedance circuit portion node.

8. The system of claim 7, wherein the third impedance circuit portion component comprises a capacitor.

9. The system of claim 1, wherein the first impedance circuit portion component comprises one of a capacitor or an inductor.

10. The system of claim 9, wherein the first impedance circuit portion component comprises a capacitor.

11. The system of claim 9, wherein the second impedance circuit portion component comprises one of a capacitor, an inductor or a resistor.

12. The system of claim 11, wherein the second impedance circuit portion component comprises a resistor.

13. The system of claim 12, wherein the first impedance circuit portion component comprises a capacitor and the second impedance circuit portion component is coupled between the first impedance circuit portion node and the second impedance circuit portion node.

14. The system of claim 1, wherein the first sensing coil portion comprises an inductive portion that has an associated reactance during operation that would otherwise be presented to the input circuit portion but for which a majority of the reactance is eliminated in the combined impedance as a result of the inclusion of the impedance circuit portion in the combined impedance portion.

15. The system of claim 14, wherein one or more impedance circuit portion components of the impedance circuit portion are configured for the eliminating of the majority of the reactance of the inductive portion of the first sensing coil portion.

16. A sensing circuit portion for inclusion in an inductive position transducer system comprising a first sensing coil portion having a first coil terminal, a second coil terminal and a coil impedance, the sensing circuit portion comprising:
an impedance circuit portion connected to the first and second coil terminals, the impedance circuit portion comprising:
a first impedance circuit portion component, wherein the first impedance circuit portion component is coupled between a first impedance circuit portion node and a second impedance circuit portion node; and
a second impedance circuit portion component which is at least one of:

coupled between the first impedance circuit portion node and the second impedance circuit portion node; or coupled between the first coil terminal and the first impedance circuit portion node; and an input circuit portion connected to the first and second impedance circuit portion nodes, the input circuit portion having an input impedance during operation, wherein the input circuit portion is configured to receive an oscillating sensing signal at the first and second impedance circuit portion nodes;

wherein:

a combined impedance portion comprising at least the impedance circuit portion and the first sensing coil portion has a combined impedance presented to the input circuit portion during operation; and the first sensing coil portion comprises an inductive portion that has an associated reactance during operation that would otherwise be presented to the input circuit portion but for which a majority of the reactance is eliminated in the combined impedance as a result of the inclusion of the impedance circuit portion in the combined portion.

17. The sensing circuit portion of claim 16, wherein the second impedance circuit portion component is coupled between the first impedance circuit portion node and the second impedance circuit portion node.

18. The sensing circuit portion of claim 17, wherein the impedance circuit portion further comprises a third impedance circuit portion component that is coupled between the first coil terminal and the first impedance circuit portion node.

19. A sensing circuit portion for inclusion in an inductive position transducer system comprising a first sensing coil portion having a first coil terminal, a second coil terminal and a coil impedance, the sensing circuit portion comprising:

an impedance circuit portion connected to the first and second coil terminals, the impedance circuit portion comprising:

a first impedance circuit portion component comprising a capacitor, wherein the first impedance circuit portion component is coupled between a first impedance circuit portion node and a second impedance circuit portion node; and a second impedance circuit portion component comprising a resistor, wherein the second impedance circuit portion component is coupled between the first impedance circuit portion node and the second impedance circuit portion node; and an input circuit portion connected to the first and second impedance circuit portion nodes, the input circuit portion having an input impedance during operation, wherein the input circuit portion is configured to receive an oscillating sensing signal at the first and second impedance circuit portion nodes;

wherein a combined impedance portion comprising at least the impedance circuit portion and the first sensing coil portion has a combined impedance presented to the input circuit portion during operation.

20. The sensing circuit portion of claim 19, wherein the impedance circuit portion further comprises a third impedance circuit portion component that comprises a capacitor and that is coupled to the first impedance circuit portion node.

\* \* \* \* \*